(12) United States Patent
Link, II

(10) Patent No.: US 10,582,412 B2
(45) Date of Patent: Mar. 3, 2020

(54) METHOD AND SYSTEM FOR PROVIDING LOW BANDWIDTH AND HIGH BANDWIDTH COMMUNICATIONS SERVICES USING DIFFERENT USER EQUIPMENT PROFILES

(71) Applicant: M2MD Technologies, Inc., Atlanta, GA (US)

(72) Inventor: Charles M. Link, II, Atlanta, GA (US)

(73) Assignee: M2MD TECHNOLOGIES, INC., Atlanta, GA (US)

( * ) Notice: Subject to any disclaimer, the term of this patent is extended or adjusted under 35 U.S.C. 154(b) by 76 days.

(21) Appl. No.: 15/593,846

(22) Filed: May 12, 2017

(65) Prior Publication Data

US 2017/0332274 A1   Nov. 16, 2017

Related U.S. Application Data

(60) Provisional application No. 62/335,393, filed on May 12, 2016.

(51) Int. Cl.
*H04W 28/02* (2009.01)
*H04W 76/11* (2018.01)
*H04L 12/851* (2013.01)

(52) U.S. Cl.
CPC ..... *H04W 28/0268* (2013.01); *H04L 47/2441* (2013.01); *H04W 76/11* (2018.02)

(58) Field of Classification Search
CPC .......... H04L 47/2441; H04W 28/0268; H04W 76/11; H04W 36/0016; H04W 36/0058
See application file for complete search history.

(56) References Cited

U.S. PATENT DOCUMENTS

| | | | | |
|---|---|---|---|---|
| 2005/0280569 A1* | 12/2005 | Park | .................... | H03M 1/1225 341/155 |
| 2009/0280812 A1* | 11/2009 | Cheng | ................... | H04W 76/27 455/436 |
| 2012/0230268 A1* | 9/2012 | Marinier | .............. | H04B 7/0626 370/329 |
| 2013/0044705 A1* | 2/2013 | Akhtar | ................... | H04W 48/18 370/329 |
| 2013/0337861 A1* | 12/2013 | Bhogaraju | ............ | H04W 52/10 455/522 |

(Continued)

*Primary Examiner* — Chi H Pham
*Assistant Examiner* — Weibin Huang
(74) *Attorney, Agent, or Firm* — John L. Doughty; Doughty Law, L.L.C.

(57) ABSTRACT

A network platform manages the provisioning of a UE with a dominant identity profile and a recessive identity profile. The dominant profile is associated with a user's existing wireless data plan and the recessive profile corresponds to a data plan of a provider of device, or machine-to-machine, services to the UE. The UE uses the two profiles to transmit separate data contexts on separate respective bearers. When managing two separate bearers, the UE always uses the dominant profile first for managing a handoff to a stronger cell. The UE reports that the new cell that now serves the dominant context is the only cell that has enough strength to support the recessive context, even if other cells near the UE have signals strong enough. This necessarily causes the recessive context to always be handed off to the same cell to which the dominant context has already been handed off.

16 Claims, 16 Drawing Sheets

Device Implementation for LTE with Carrier Aggregation and RCFD

(56) References Cited

U.S. PATENT DOCUMENTS

| | | | |
|---|---|---|---|
| 2015/0016282 A1* | 1/2015 | Su | H04W 36/0085 370/252 |
| 2015/0296369 A1* | 10/2015 | Berionne | H04W 8/183 455/418 |
| 2016/0014280 A1* | 1/2016 | Brunsman | H04M 15/774 455/407 |
| 2016/0043829 A1* | 2/2016 | Chen | H04L 1/0057 714/776 |
| 2016/0192200 A1* | 6/2016 | Chin | H04L 43/04 455/405 |
| 2016/0353274 A1* | 12/2016 | Chichierchia | H04B 1/3816 |
| 2016/0366615 A1* | 12/2016 | Batchu | H04L 47/14 |
| 2017/0164184 A1* | 6/2017 | Borse | H04L 67/306 |

\* cited by examiner

- Source eNodeB configures UE measurements and reporting
- Source eNodeB receives UE measurement report

- Handoff Request from Source eNodeB
- Handoff Acknowledge from target eNodeB

- Handoff Command to UE from Source eNodeB
- Data Forwarding initiated from Source eNodeB to target eNodeB

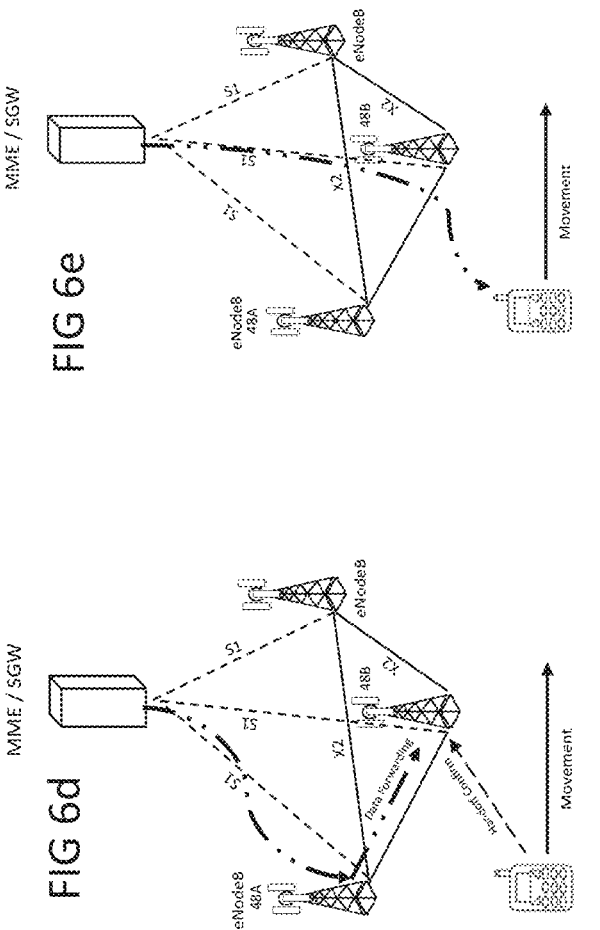

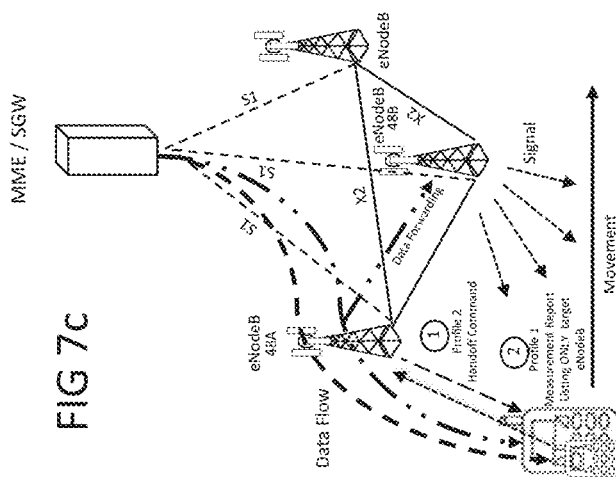
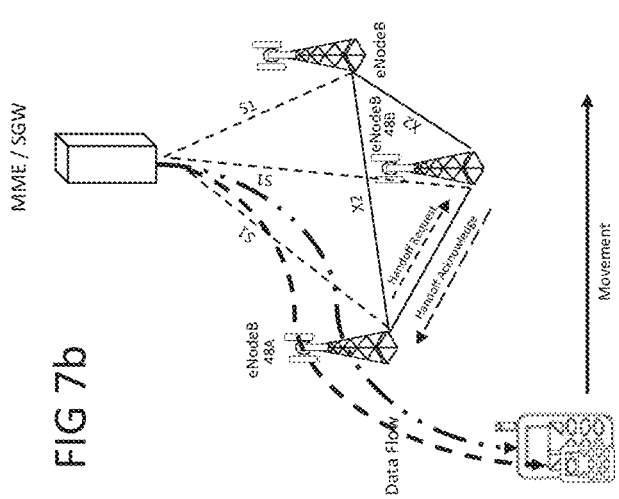
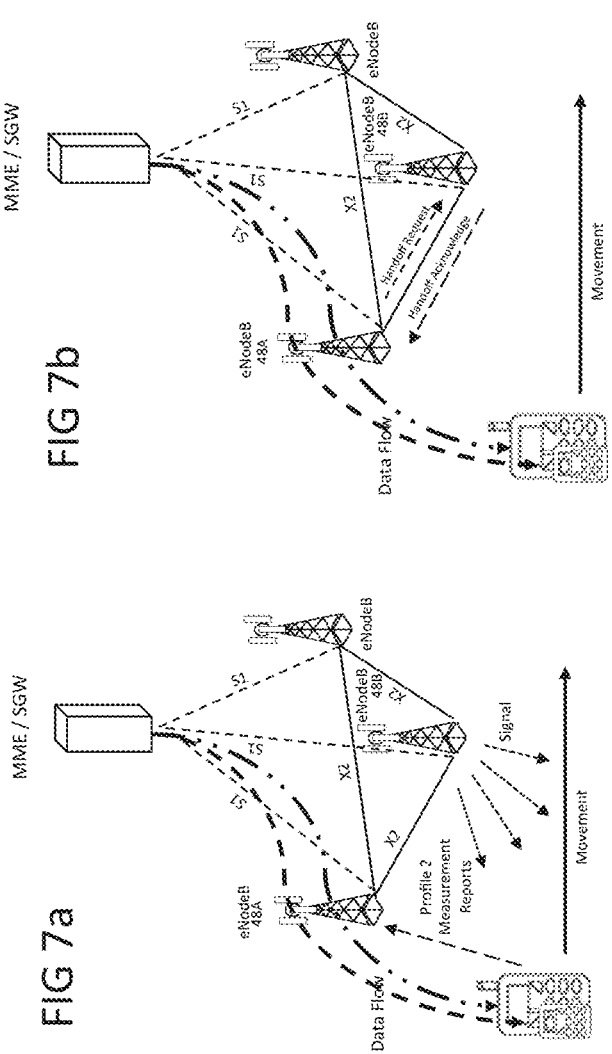

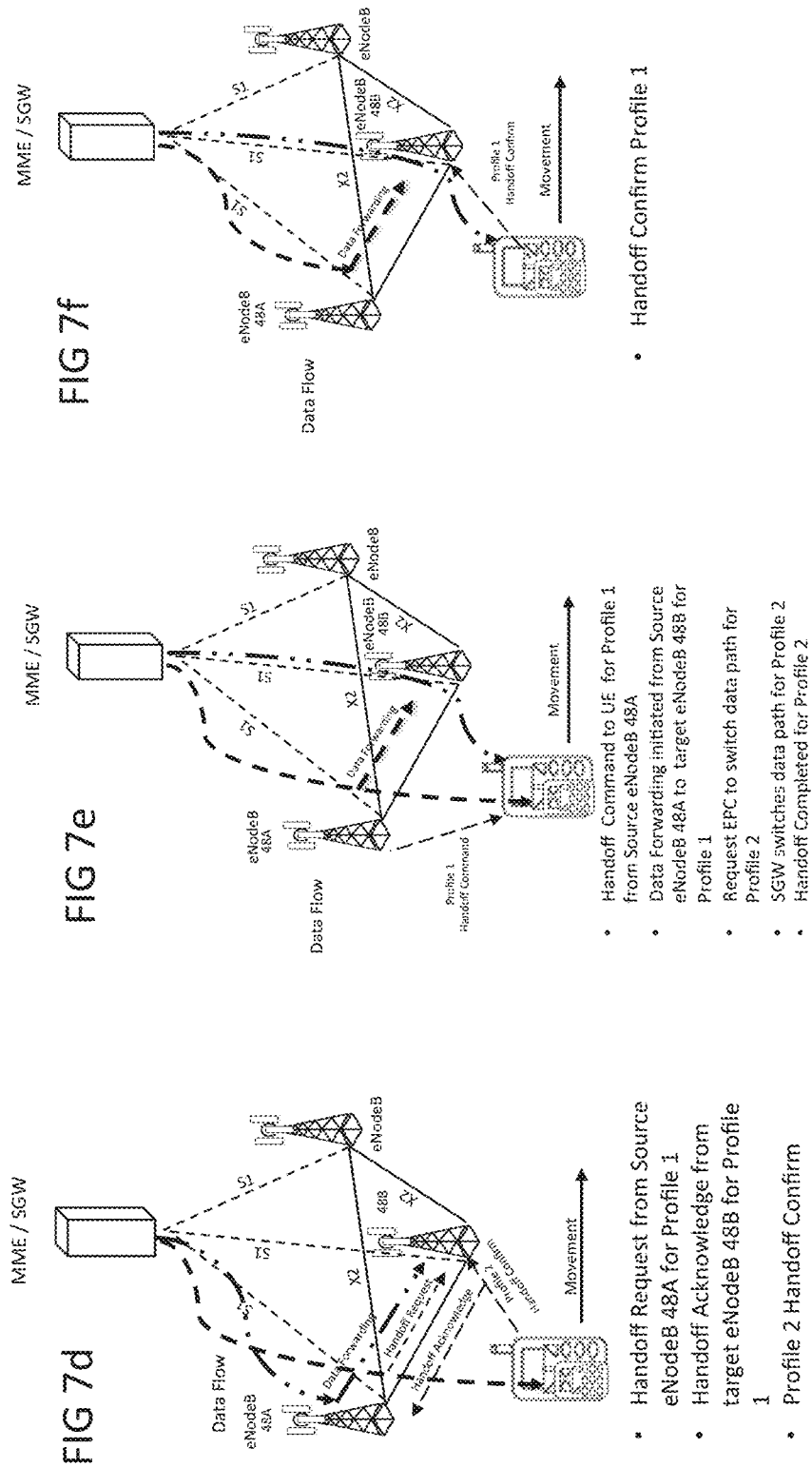

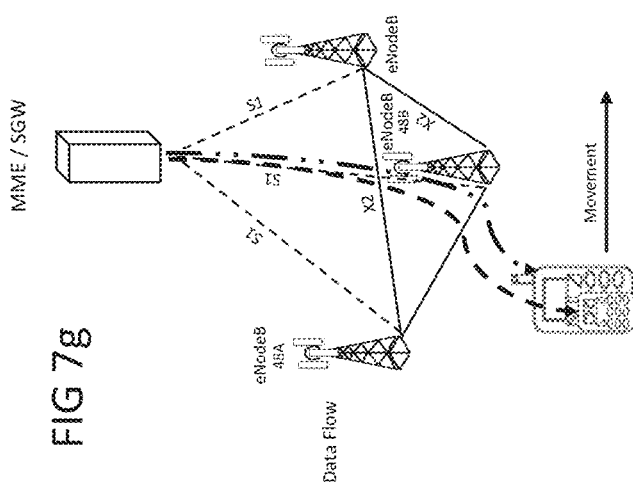

FIG 10    Typical Radio Implementation for LTE

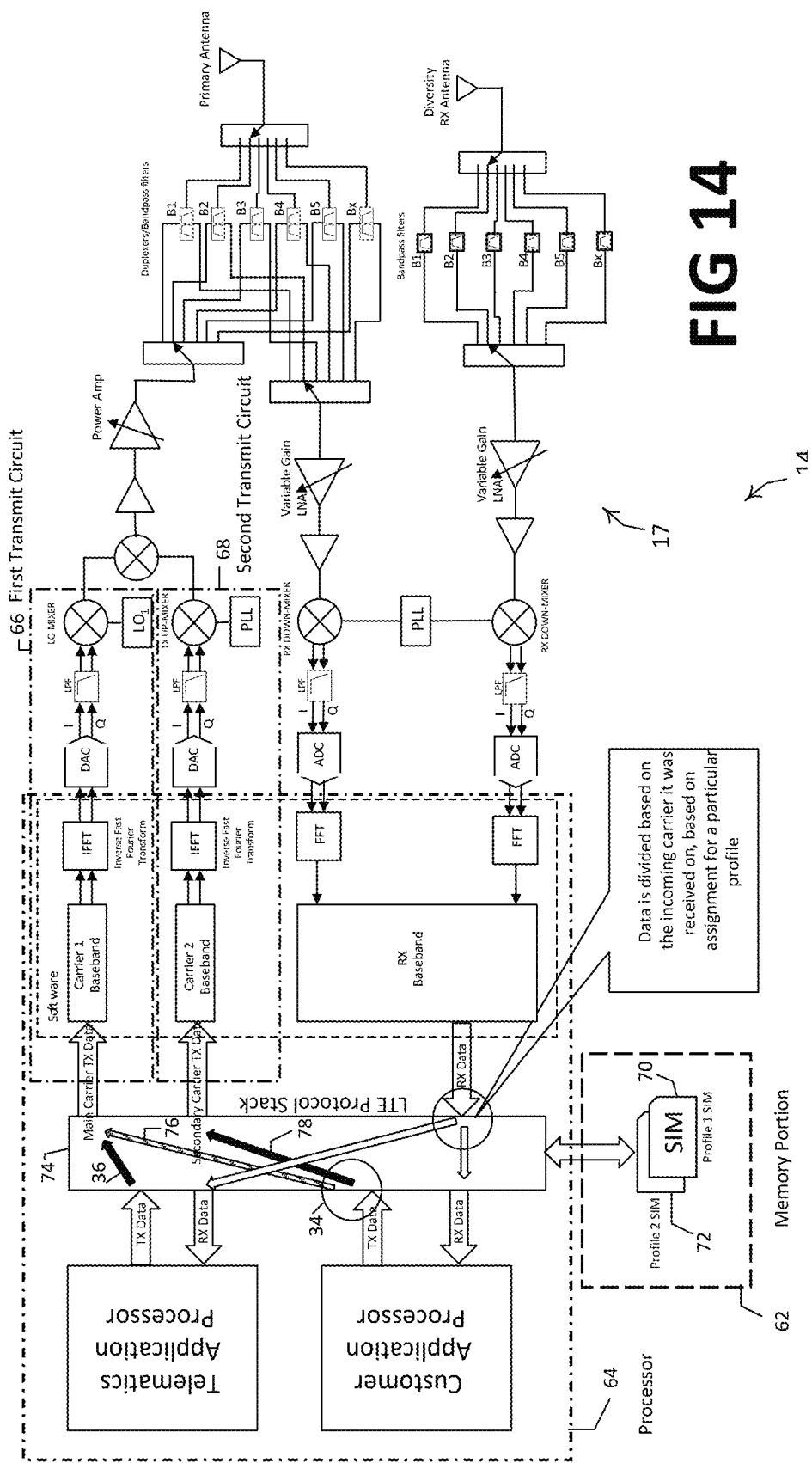

METHOD AND SYSTEM FOR PROVIDING LOW BANDWIDTH AND HIGH BANDWIDTH COMMUNICATIONS SERVICES USING DIFFERENT USER EQUIPMENT PROFILES

CROSS REFERENCE TO RELATED APPLICATION

This application claims priority under 35 U.S.C. § 119(e) to U.S. Provisional patent application 62/335,393 entitled "Method and system for providing high volume high bandwidth [sic] communications wireless communications services across many mobile network operators," which was filed May 12, 2016, and which is incorporated by reference herein in its entirety.

FIELD

The field relates, generally, to telematics devices and systems, and other wireless devices and systems, and methods for delivering high volume, high bandwidth wireless data connectivity to consumers across multiple mobile network operators using a single wireless communications radio (cellular module) without requiring multiple front-ends, filters, amplifiers and antennas to support dual SIM operations, while allowing dual active operation on two subscriptions simultaneously.

INTRODUCTION AND PRINCIPLES

Telematics may refer to the integrated use of telecommunications devices and systems and information storage, usage, transmitting, receiving, and processing. More simply, telematics may refer to sending, receiving and storing, information via telecommunication devices. Telematics devices and system have been applied alongside Global Positioning System ("GPS") technology integrated with computers and mobile communications technology in automotive information and navigation systems.

Other than the convergence of telecommunications and information processing, the term telematics may also refer to automation of various processes relating to the driving and using of automobiles. For example, a telematics system can report emergency situations to a telematics service provider's central location via a voice telephone call over a wireless communications network, or a message sent electronically over a network, including a wireless communications network and the Internet. Telematics also includes services such as GPS navigation, integrated hands-free cellular telephony, wireless safety communications, and automatic driving assistance and information systems such as traffic, restaurant, fuel, and emissions information. IEEE standard 802.11p refers to Wireless Access for the Vehicular Environment to facilitate and enhance Intelligent Transportation.

A telematics services provider ("TSP") typically operates a call center staffed with live operators who respond to emergency calls and to contact the appropriate responders to the emergency; the live operators also typically perform customer service tasks during real-time conversations with a user/subscriber, or with subscribers-to-be as they register their telematics device for service. The TSP also typically has a telecommunications operations center ("TOC"), which typically includes a computer servers and other networking equipment to connect the server with various networks such as the Internet. A telematics control unit ("TCU") installed in a vehicle, either at the time of manufacture, or after the vehicle was placed in service, typically contains a GPS portion (which portion may be referred to as a GPS circuit or a GPS module), a cellular telephony portion (which may be referred to as a cellular, or long range wireless, portion, circuit, or module), and general computer electronics such as a memory, a general processor, I/O interface, etc., which are coupled to the GPS portion and to the cellular portion.

A subscriber typically pays a monthly service charge to the TSP. The TSP establishes and maintains a wireless service subscription with the wireless carrier, such as a cellular telephone service provider, so that the TCU can communicate with the TOC via wireless and Internet. This connection can also facilitate Internet availability and functionality for a subscriber in the vehicle thru the TCU. In addition, Internet connectivity facilitates a subscriber transmitting and receiving information between car and a personal computer, smart phone or tablet or other computer device connected to the Internet.

A TSP typically establishes an account with a long-range wireless carrier, such as AT&T or Verizon, (the establishing of an account may be referred to as activating or provisioning a wireless account) so that a TCU can communicate across the wireless carrier's wireless (typically cellular) network. After a TCU has been installed in a vehicle, the vehicle's manufacturer, or the retail dealer selling the vehicle, typically obtains a unique identifier of the TCU, the vehicle's Vehicle Identification Number ("VIN"), a unique identifier corresponding to the wireless telephony portion of the TCU, and the vehicle owner's name and forwards the identifiers and vehicle owner's name to the TSP. The unique identifier of the wireless telephony portion typically includes an International Mobile Subscriber Identity ("IMSI") and/or Integrated Circuit Card ID ("ICCID") for mobile network access devices using GSM, UMTS, or LTE wireless technology. The TSP may manually obtain the mobile unit's unique identifier and manually forward it to a wireless carrier via a voice telephone call, or completing form and mailing, or sending via facsimile or e-mail, to the wireless carrier. The TSP may electronically communicate with the wireless carrier using a predefined Application Programming Interface ("API") to activate wireless service. The wireless service provider typically begins billing the TSP for wireless service for the specific activated account upon activating the wireless portion of the TCU for wireless service. The TSP typically begins billing the vehicle owner/subscriber for telematics services upon receiving payment information from the vehicle owner.

In past subscription models, a vehicle may have been provided to the new-vehicle-owner without prepaid service (i.e., without having been separately paid for by the new-vehicle-owner), but with the telematics services provided on a trial basis for a period of time after the purchase of the vehicle. For one-way services like Automatic Crash Notification ("ACN") or Emergency Calling ("ECALL"), telematics service providers did not necessarily need customer information and customers could enjoy such 'Safety and Security' services without providing customer specific information until the trial period ended. If the new-vehicle-owner, or customer, chose to subscribe to additional services, (i.e., Internet Hotspot or Streaming Audio) it was up to the customer to establish contact with the telematics service provider and agree upon a method for payment for the service period extension.

High volume data services, such as video or audio streaming, web browsing, document and file downloading, and the like, are beyond the scope of services that may be offered by vehicle original equipment manufacturers ("OEM") and TSPs alike, but OEMs want to add such capability to the vehicle. Customers like the flexibility of an in-car connection, but don't necessarily want "yet another subscription". Customers want the ability to use data from their existing rate plan "data bucket", but until the herein disclosed solution, logistical challenges made this impossible.

A designated and OEM-selected wireless operator provides existing telematics connectivity services. This arrangement means that all services, whether it is low volume diagnostic services, firmware reflashing, or remote control services like remote door unlock or vehicle pre-conditioning, (otherwise known as "Vehicle Centric Services") are typically provided by a single wireless operator. All communications to and from the vehicle use a single virtual pipe to the local serving wireless network operator's towers, through his packet core and then to the GSM Roaming Exchange or the IP Roaming Exchange. The GRX and the IPX are different names for an Inter-Operator IP network that allows mobile devices operating outside of their designated home network to reach back to the home network.

Roaming on third party Radio Access Networks ("RAN") allows a mobile device to have a wider coverage area than a single operator could normally provide allowing nearly ubiquitous coverage. Normally a single wireless operator provides service to subscribers through a combination of "home (or local, owned) networks" and some third party "roaming networks," sometimes even within the same geographical market area. These extensions to the RAN allow a network operator to provide a much larger virtual network than could normally be afforded. When a mobile device travels outside of the network of the network operator providing the service subscription, the network operator providing the subscriber subscription must compensate the third party network operator for airtime and data usage. The charges for the usage off of the home network are usually considered premium charges and if they are premium charges, they are billed over and above the normal monthly fees associated with the basic subscription.

Network operators usually assemble a set of third party wireless operator's networks to augment their basic "home" network. The "home" network normally refers to the RAN where normal operations are not considered premium services. Although any operator and RAN, whether home or roaming can charge usage fees based solely on consumption, the term premium generally refers to services that are outside of the normal subscription plan and rates. Home charges are based on normal home rates and roaming charges are based on premium charges over and above the normal home subscription plan and rates.

Normal subscriptions in the home network are based on the wireless customer purchasing a preset amount of airtime or wireless data at a specific price. The price might be 1000 minutes of airtime [MOA] for $10 or it might be 1 Gigabyte [GB] of data for $10. Most rate plans are based on the customer purchasing a set amount of data and minutes of airtime in anticipation of the customer using that amount of data over the purchase period, for example, 1000 minutes of airtime and 5 GB of data for $60 for one month. If the customer uses more airtime or bytes of data, the customer will pay overage charges for usage. In addition to the base $60, if the customer travels to a market that is not part of the home network, the customer will pay charges, known as roaming fees to the home network operator for the airtime or data usage in the roaming market. Typically the roaming fees are based completely on usage and the price is usually significantly higher than the basic airtime and data prices in the home market.

As the wireless data consumption and minutes-of-use have increased by customers and as more customers get additional devices that consume data, wireless operators have reciprocated by offering bigger packages of data and perceptually lower prices. When a wireless customer purchases a tablet or notebook equipped with mobile wireless data services, the customer might purchase a bigger data plan, perhaps 10 GB of data for $80 to support both the smartphone and tablet. The perception of data at $8 per GB is better for the customer, while the wireless operator realizes that the $80 package is higher revenue per customer, but not necessarily 5 GB of additional usage by the customer because the customer now may use his tablet for reading his email that he otherwise might have read on his smartphone. The customer is happy with his lower monthly cost per GB while the operator is happy because he has greater revenues but not necessarily greater usage.

Because of the specific overage fees and rate plans, the wireless operator conditions his wireless customers to maintain a rate plan that offers more data (sometimes significantly more data) than the individual wireless customer normally consumes. If a customer ever exceeds his allotted rate plan, most wireless operators almost punitively charge that customer for his extra usage. This strategy creates a dynamic where the fear of excessive and unpredictable usage charges for small overages encourages wireless customers to "over subscribe" to data. In the end, for each separate account, wireless customers normally over subscribe to far more data than they will ever use.

The wireless operators understand and manage the customers' fear of overage charges. It is this fear of overage charges that keep the dynamic working for the operator. The typical customer purchases more than enough extra data and uses only a fraction of it. From an operator's perspective, this is called "breakage". If a customer buys twice as much data as he uses, the effective price is two times the apparent price. From a customer's perspective, if he is able to add multiple devices to his rate plan, this limits the breakage to that of a single rate plan. From an operator's perspective, more devices drive more usage and more GB overall sold to that particular customer. More GB of usage means perhaps a larger "bucket" of data with a larger cushion that the customer is willing to buy. It means that the customer is less likely to shift his account if he has multiple devices that are part of the same plan. Customers readily add new devices for a small sum of extra money, typically $10 per device. Everybody wins.

The desire to add new devices to multiple-device data plans is very strong. Its success has been established in the marketplace. For cost conscious customers though, connected cars currently are just another subscription and usually not as low as another device. Unfortunately with the methods that have been offered by the wireless operators and adopted by the automobile OEMs [AOEM], it is nearly impossible for a vehicle owner to add a new vehicle to an existing multiple-device data plan. The automobile OEM chooses the wireless operator. Normally the automobile OEM chooses a large operator with a likelihood of having as many native networks, and the largest geographic footprint as possible to minimize operating costs by minimizing usage on third-party networks. That means that the OEM will generally select one of 5 or 6 different operators worldwide.

Once the OEM has selected the wireless network operator, due to 3GPP design limitations, until recently, all network traffic originated or terminated in that wireless operator's network. More specifically, the wireless traffic originated and terminated in one or two countries. All data usage traversed the IPX/GRX networks back to the home network of the selected wireless network operator who provided the SIM. GSMA and 3GPP have anticipated the global roaming needs of such devices that include automobile telematics and have specified local breakout mechanisms. Local breakout mechanisms are part of the Forth Generation 4G network architecture, but still don't necessarily solve the problem. Even though the traffic is routed directly to the local Internet in a visited country, roaming traffic is still roaming and the local operator who owns the RAN charges the home operator for the data usage.

Modern telematics devices usually carry two types data of traffic. Some traffic, for example diagnostics and firmware reflashing is carried on behalf of the OEM and the remainder of the traffic is carried on behalf of the driver of the car. Similar to the local breakout needs, GSMA and 3GPP anticipated the need to two or more responsible parties for paying for network data traffic. Split billing methods have been on the roadmap for years. Unfortunately the consuming public has changed as rapidly as the wireless network systems have been developed. In the past where it might have been acceptable to offer an additional data plan for one's automobile, today, that is far from desirable in most markets, especially given the other competing solutions.

One recent development in this space is the eSIM. The eSIM is a Subscriber Identity Module that allows "over-the-air" personalization. Specifically, the eSIM allows a wireless operator or "subscription manager" to push the profile for a new wireless network over-the-air. Practically it removes the need to install a new "removable" SIM every time the subscription changes from one wireless network operator to the next. The eSIM has been considered a major boon to offering the consumer a local combined billing solution (meaning the consumer can combine his telematics data usage with his smartphone data usage). It is envisioned that an OEM or TSP can "push" a profile of wireless operator of the vehicle owner's own choosing into the vehicle and the vehicle owner can combine the bill for his personal data services in the vehicle with the data he consumes from his other devices. The diagnostic and reflashing services could be split out and billed separately, and directly to the OEM.

In places like Europe, where the vehicles are sold in every country, it is nearly impossible for the OEM to establish direct wireless operator relationships to placate every possible customer. With 30 countries and 3 or more operators per country, the list is long. An industry consortium is possible but it will be a challenge. One overlooked aspect of this solution is that although the OEM is able to push a new SIM profile to the vehicle, somehow, that OEM must also provision the new SIM profile into the business and operations systems that enable the subscription and billing for the new customer. Wireless operators are loath to allow outsiders and third parties access to the "keys to their kingdom". Privacy rules make it tricky as well.

A second overlooked aspect of the eSIM technology is the need for vehicle centric services like diagnostic and reflashing services. There is a strong need for services like battery charge status that "reach out to the vehicle". Without a central connection, these services become insecure and difficult to manage. Once a new profile is pushed into an eSIM in a telematics unit, the OEM must actively manage the connection because without the connection, the OEM will lose the significant strategic value of having the car connected in the first place.

Roaming prices in markets outside of the home market have remained a significant topic of discussion. In Europe, for example, a wireless consumer can easily purchase wireless data at less than $5 per GB. However, that same consumer will pay at least $50 per GB for data outside his home market. Roaming has been a traditional cash cow for network operators throughout the world. Regulations in Europe attempt to force the free market system to encourage customers to use their phones outside of their home markets. According to some statistics, 80% of all users turn their data function off while roaming. EU regulations have attempted to eliminate roaming charges and these regulations have received great resistance from network operators there. Although the new regulations will take affect soon, they don't solve the complete problem. The roaming rates will only apply to consumer devices (perhaps an automobile will apply) and significant limitations will apply to block enterprising customers from signing up for service with the lowest price operator in a market foreign to the customer's own market.

The future of the connected car industry is questionable if one considers the upcoming regulations. Will all operators allow the automobile to be part of a consumer rate plan for the purposes of the roaming costs and regulation or will the operators consider the automobile part of the business and industrial market since the SIM subscription is most likely part of an OEM's consolidated fleet plan?

Current systems all fit neatly into one of several types of systems:

1. Complete Roaming Environment: In this type of system, the OEM contracts with a single "prime" wireless operator and the prime operator creates roaming relationships with "local" operators in each market. The local operator has a defined price per minute of use and per Megabyte [MB] of data. All airtime and data usage is billed by the local to the prime operator through inter operator rates set either for all customers or for the specific OEM contract. The prime operator bills the OEM for a monthly reoccurring charge and the airtime and data usage rates. The local operator typically receives no monthly reoccurring charge for devices that don't use airtime and data. Typically the rates are higher because the local operator does not receive monthly compensation.

2. Roaming SIM for Low Volume and Native Local SIM for High Volume: This is a hybrid model where all devices that consume only a small amount of vehicle centric data, for example diagnostics, firmware reflashing and limited remote control, remain in a complete roaming environment as described above. If the vehicle operator consumes more than a small amount of data, particularly for customer facing services, for example wireless hotspot or streaming audio, the prime operator may contract with a single local operator to purchase a local profile and the prime operator may utilize eSIM technology and re-IMSI the wireless device and operate the vehicle as a local device in the specific country or market where the vehicle is domiciled. The local operator bills the prime operator for the monthly reoccurring SIM charge and the airtime charges used by the SIM. The local operator will bill the prime operator for all airtime and data usage by the low volume roaming devices. The local operator usually sells high volume data at a much lower price per GB because the local operator also receives a monthly reoccurring charge for the SIM and the local operator now has ultimate control of the SIM.

3. Native Local SIM for all devices: This model is one where a single mobile virtual network operator [MVNO] operates as a prime MNO and aggregates the SIM profile and services for many local operators within a region. Each local operator provides the prime with a block of SIM profiles and the prime MVNO uses eSIM technology to re-IMSI the SIM to from the "anchor" profile to a local profile when the vehicle is sold to a specific customer and the domicile is determined. Each local network operator bills the prime MVNO for monthly reoccurring charges as well as airtime and data usage. This solution is successful if individual airtime or data usage is high enough to offset the higher monthly reoccurring charges. The MVNO must have MVNO agreements with each operator in each country and must operate a provisioning system that supports each of the local network operator's provision API's.

Each of the above systems is workable in it's own right. Each has aspects that are advantageous to each of the others. One outstanding thing for each is that the above systems have a single point of contact for the AOEM. The "Prime" mobile operator manages all wireless SIMs and wireless service. This should be the function of the wireless operators and it should be well understood by the prime operator. An alternative to the above model is for the AOEM or device maker to contract with independent operators in each operating area or country and arrange for wireless services. However, each of the above methods misses one important aspect, and that is that a direct customer relationship is most likely necessary to provide high volume, high bandwidth data connectivity for customer facing services. (That is unless the AOEM or service provider decides to pay for all data consumed by the vehicle operators . . . an unlikely scenario.)

The solutions that exist in the market today fit neatly into the categories previously described. In each case, an entity must manage the relationship between the wireless operators who provide the RAN, the AOEM and possibly the end customer. Both the AOEM and the managing entity have visions of massive subscriptions and massive profit margins on the backs of the local serving wireless operators that have invested the capital in building the RAN. Further, the poor customer is meanwhile expected to subscribe to yet another bucket of data at inflated prices. Most likely, the automobile owner/operator has to create a new account with a new entity and in markets like Canada and Europe, that new entity might not even be a local entity. Never mind that the local wireless operator may be selling against himself by offering significant discounts to the AOEM or the managing entity, while that entity sells to the local customer.

In view of the aforementioned difficulties of operating the traditional telematics system using wireless services with existing business rules, a new system and method has been designed and deployed to provide high volume, high bandwidth service to telematics customers in order to insure long-term success. One of the most important aspects of the new system is the ability for the automobile owner/operator to include the purchase of airtime and/or data from his existing wireless provider. The customer's existing (local) wireless provider can provide the best customer service and the best prices without the extra middlemen in the equation.

From a technology perspective, the simplest solution is the solution that has been deployed in vehicles from several OEMs in Europe for years. The solution involves a SIM card slot on the dashboard. As simple as this solution sounds, it has its challenges, especially for the diagnostics, firmware reflashing and remote control. Although the removable SIM, whether supplied by the customer, the local dealer, the distributor or OEM can work, and has worked in some situations in the past, from the security aspect, it is a non-starter for services that involve the OEM or TSP reaching out to the vehicles (vehicle terminated). Any vehicle-terminated traffic would be significantly challenged with security issues with a consumer SIM operating on what is effectively the open Internet. From the aspect of the consumer, and consumer facing services, the SIM slot on the dashboard is the best solution to the problem as it allows the customer to decide who provides the outgoing connectivity to the vehicle for consumer facing services. It two different telematics communications radios are installed in the vehicle to solve the vehicle-terminated and security problems, from a resource utilization perspective, the solution is almost a complete looser, especially for the customer who has to purchase at AOEM markup, two different telematics communications radios (cellphones) and associated hardware like antenna feed line and antennas. Not only does the customer have to purchase the additional hardware, the customer has to pay for the decreased fuel economy due to the extra weight of the second set of hardware.

The AOEM has a belief that if a single radio solution is to be considered acceptable, and the SIM card of the telematics unit is to be programmable and adaptable to wireless operators in every market, then this is the ideal solution. And it may be acceptable to some portion of the customers who are willing to subscribe to a new wireless service with a new "bucket of data." However, it may not be acceptable to all customers.

Aspects disclosed herein combine multiple solutions, but focus on a concept and an a corresponding technical system that supports the concept. Local wireless operator participation in the consumer portion of the wireless usage is a part of the concept. An automobile OEM selects an "anchor" wireless supplier, and much like the "prime" operator described in solution 1 above, the anchor operator manages the relationship with the AOEM for all vehicle centric traffic. The anchor operator provides the "evolved packet core" or GGSN for all vehicle centric traffic. The anchor operator provides the Home Subscriber Server [HSS] that contains the IMSI used for vehicle centric traffic and the authentication center containing the subscriber key for vehicle centric traffic. The anchor operator provides basic roaming service through roaming agreements with local wireless network operators for all vehicle centric traffic. Preferably, the roaming agreements will be with all possible available operators operating in a given service area. The anchor operator provides the OTA system to update the "Public Land Mobile Network" [PLMN] roaming list in the SIM. The anchor mobile network provides the SIM management platform to configure and download a second SIM profile for customer facing traffic.

A central aspect disclosed herein is specific device technology that supports multiple LTE profiles on a single hardware user equipment device platform, such as a cellphone/smartphone platform, utilizing a single radio transceiver, with a single RF front end and associated filters, amplifiers, and antenna. The single radio transceiver configuration cooperates with a management gateway that allows the AOEM and Operator partners (as well as the anchor operator) to jointly manage the two or more SIM profiles. In existing wireless network operations, a single-SIM-profile-per-radio-transceiver is carefully managed and controlled by a single entity, a single wireless operator, or its agents on behalf of that single operator. In the case of an anchor operator, heretofore the single-SIM-per-radio-transceiver is managed by, and only by, the anchor or through management mechanisms delegated directly to the AOEM or the TSP. Even multi-tenant management platforms as provided by, for example, Jasper Technologies, Inc. (which is now owned by Cisco Systems, Inc.), clearly segregate different operators' devices and SIM management functions. In a multi-tenant environment, if an OEM has relationships with multiple wireless operators, each wireless operator has his own ICCID/IMSI (and hence SIM card) managed by the platform and the management is not holistic; instead, management of different operators' devices is clearly segregated between the different operators. One wireless operator does not manage the SIMs of another wireless operator in a multi-tenant environment, such as facilitated by the Jasper platform.

A second differentiating aspect disclosed herein involves cooperation with the management gateway in providing localized service. In solutions currently envisioned by the industry, a local ICCID/IMSI is installed using eSIM or similar technology in the SIM card if locally managed service is required. This provides the local management and local service aspect of the connectivity services. Aspects disclosed herein use a two-operators' ICCID/IMSI throughout the life of a devices wireless service, much like that of solution 2 above, but these two operate in a new way on a single radio transceiver.

Wireless data and voice traffic is carefully managed in existing wireless networks. Various methods are established by the "Third Generation Partnership Project" [3GPP], a world-wide network operator consortium that establishes methods and standards and requirements for wireless network operation. Those methods may or may not be fully deployed by wireless network operators that own and operate the local RAN and provide local wireless services to consumers. 3GPP from a technical network operating perspective has defined operating methods and processes that aspects disclosed herein utilizes along with the newly disclosed management gateway that does not conflict with 3GPP standards.

The management gateway aspect disclosed herein specifically defines, supports, and facilitates new technology that is part of the "Operations Support System" and "Business Support System" OSS/BSS that operates the part of the network that facilitates network services for wireless devices. This gateway has an interface on one side that faces multiple other third party wireless network operator partners. In a typical scenario, the partners, specifically, are the local operators that provide the local component of service to the end customer (consumer/vehicle owner/driver). The partner interface provides both an application programming interface ("API") and web services ("HTML") interface for management of an aspect of wireless service. The partner interface facilitates controlling operation of wireless devices with respect to enabling customer-facing service. If a wireless device is completely disabled, meaning it has no wireless service or data connectivity for either vehicle centric service or customer-facing service, this interface can enable the SIM and enable basic service that allows for customer-facing service, not vehicle-centric portion of the service. If the wireless device already has basic service for vehicle centric services, the interface can enable the additional customer-facing service, in addition to the existing vehicle-centric service that is already there.

The management gateway has an interface for B2B customers. Specifically, the management gateway has an interface for automakers and/or TSPs. The interface includes an API and HTML interface for management of another aspect of wireless service. Unlike the partner interface described in the previous paragraph, the B2B interface allows users (i.e., employees of automaker OEMs or telematics services providers) to enable and disable connectivity for vehicle-centric services for a specific device that has a specific SIM card (or specific virtual SIM). The B2B interface is used to enable connectivity for vehicle centric telematics services that use typically small amounts of data, for example diagnostics firmware reflashing or remote control operations. The B2B interface facilitates users to control connectivity that is normally (but not necessarily) paid for by the OEM or TSP in conjunction with the airtime and data usage for all vehicles in a designated fleet. Vehicle centric services would normally (but not necessarily) be carried through the IPX/GRX network from the local network operator Serving Gateway (SGW) to the anchor operator's Packet Gateway (PGW) that provides an SGi interface to the Automaker/TSP. Similar to the Partner interface, the B2B interface may be used to enable basic wireless connectivity and connectivity to an access point name ("APN") designated by an anchor MNO for vehicle-centric services data traffic. If the wireless device has no service, the wireless device SIM would typically be enabled by using the profile of the AOEM's contracted MNO. If the SIM already has customer-facing services that were enabled using the profile of an MNO that was chosen by a customer/end-user to provide his, or her, personal wireless data service, the SIM would be further enabled for the AOEM's MNO profile and the APN designated by the mobile network operator for vehicle centric services. In the case of disabling, if the SIM is not required to provide high volume, high bandwidth ("HVHB") customer-facing services, then the SIM can be completely disabled by the B2B interface. If the SIM is used to access HVHB services then only the AOEM's MNO profile, APN, and connectivity facilitators to the APN for vehicle centric services may be disabled.

The management gateway interfaces enable the mobile device using 3GPP standard methods for enabling a SIM card, including using a provisioning connection to the HLR or Home Subscriber Server [HSS] and the Policy and Charging Rules Function[PCRF] [3GPP Network Elements] of a home MNO corresponding to the SIM. The management gateway would normally, but not necessarily, only activate the HLR/HSS/network elements of the MNO that is contracted by the AOEM. The management gateway interfaces disable a mobile device using 3GPP standard methods for disabling a SIM card including a provisioning connection to the HLR or HSS and PCRF. Provisioning a device entails many steps that each may enable or disable some functionality of a user equipment device. For example, it is possible to enable voice service without enabling data service, or it is possible to enable data service only in designated markets. It is possible to provision a device with standard 3GPP Network Elements to operate in some markets and not others. It is possible to provision 3GPP Network Elements to the Home PCRF ("H-PCRF") that further transmits the policies of the H-PCRF to the Visited PCRF ("V-PCRF"). The V-PCRF further transmits the policies of the V-PCRF to an enforcement function know as a Policy and Charging Enforcement Function ("PCEF"). The PCEF is a 3GPP Network Element, or function block, within, or associated with, an LTE PGW. Heretofore, a specific SIM is normally and strictly managed by a single network operator (or its designee), and that is the single network operator that provides the SIM.

Privileges of each API or HTML interface should be understood. Each of the partner interface and the B2B interface confer special privileges to an actor who has access to the given interface. If the actor is an employee of a partner MNO, the partner API or HTML interface can be used to enable or disable functionality for high volume, high bandwidth data in a specific market or multiple markets. This data is segregated specifically by the functionality embedded within the wireless device that uses a two-or-more-SIM-profiles arrangement, either contained in a single physical SIM device or contained in one or more physical SIM devices, and routes IP traffic to a specific endpoint in the wireless network. This routing would be controlled preferably according to APN, but alternately it could be controlled by IP address, URI, URL, port number, or any other embedded tag contained in the IP record and it could include wrapping the IP packets with IP security methods similar to IPsec. Preferably when the partner MNO enables high volume, high bandwidth data for a device using multi-profiles/multi-identities, it routes traffic through a local PGW owned and operated by the partner. This is known in the 3GPP world as "local breakout."

If the actor accesses the API or HTML interface using the B2B interface, an additional set of functionality is granted to the wireless device. Vehicle-centric services like traffic that transports: vehicle diagnostics information, firmware reflashing, remote control messaging, or any other data relative to the vehicle itself, is segregated from the high volume, high bandwidth customer-facing data using the functionality as described above. This IP data is routed preferably to a different endpoint than the high volume, high bandwidth data described above. This endpoint routing is controlled preferably according to APN, but alternatively endpoint routing may be controlled by IP address, URI, URL, port number, or any other embedded tag contained in the IP record, and endpoint routing may include wrapping the IP packets with the IP security methods similar to IPsec.

Each interface on the management gateway preferably works as an "or" function with the overall enablement of the wireless device and SIM. If either interface has been specified to enable data, whether it is for customer facing high volume, high bandwidth Internet connectivity or whether it is for the OEM enabled services like diagnostics, firmware reflashing, and remote control or similar services, the wireless device and SIM has been configured with at least one, but potentially more SIM profiles, and is allowed to register on at least one MNO network somewhere. A SIM may be configured to operate on only one network, it may be configured to operate on a group of networks, or it may be configured to operate on all possible networks that are accessible. The second aspect of the enablement function is the access privileges granted. A SIM may be enabled for a limited set of services, perhaps voice only or data only, and/or it may be enabled for a broader set of services. A SIM may be configured to allow access only to a single network with a single service, perhaps data only on one mobile network operator's RAN, as identified by the Mobile Country Code ("MCC") and Mobile Network Code that compose an IMSI ("MNC").

The management gateway also preferably controls a subscription management platform; known specifically as an SM-DP ("Subscription Manager Data Preparation") in GSMA's *Remote Provisioning Architecture for Embedded UICC Technical Specification, Version* 3.1, 27 May 2016. The SM-DP is a platform and part of a system designed to re-credential an active SIM subscription. Simplistically described, the SM-DP can deliver subscriber identities/profiles over-the-air to electronically swap SIM profiles between one single active profile and another single active profile in the same device. Generally, but not exclusively, SIM profiles are stored in a user equipment device by mechanisms such as, for example, an eSIM, an Embedded Universal Integrated Circuit Card [eUICC], a SIM, a UICC, or a virtualized SIM. Currently, in a user equipment device there may be one or more SIM profiles stored in the user equipment device, with a single SIM profile, corresponding to a single MNO subscription, active at a time. An aspect disclosed herein allows two or more active SIM profiles, with subscriptions from more than one MNO, to be active simultaneously.

The management gateway also preferably (and optionally) controls a network based "Preferred Public Land Mobile Network List Generator" ("P-PLMN-LG"). The P-PLMN-LG generates specific PLMN selection and roaming lists to steer the mobile device to specific networks according to a predetermined priority. Preferably, the mobile device contains a PLMN list within the SIM card (or other form of storing subscriber identities and corresponding subscriber profiles whether virtual or physical), that manages the selection of PLMNs according to the priority order. The highest priority PLMN that is available and allowable when a selection is being made by a user equipment device is selected as described in 3GPP TS 23.122. Although use of PLMN lists, the creation of PLMN lists, and updating of PLMN lists in wireless devices is substantially standardized among wireless operators; aspects disclosed herein utilize such methods of creating PLMN list, but with a unique twist.

Conventionally, an operator creates and updates a very limited PLMN list and provides that list to nearly every customer in a specific fleet of user equipment devices. For example, some operators load a very specific list of networks for domestic roaming within a country and outside of the country, only contracted-with partners are typically listed, and operators who charge high roaming rates may be specifically excluded. Because of device-constraint-limitations of the roaming list size and the operator scanning complexity, limited PLMN lists are typically sent to subscribers. A user equipment device itself has some ability to mark networks as unacceptable networks if the network regularly blocks access by the wireless device.

For a specific telematics solution (i.e., device centric, or vehicle-centric, low bandwidth data service flows), a PLMN list could be configured to operate on one or more specific operators while excluding undesirable operators. This list could be considered the "standard telematics preferred PLMN list." If a partner accesses the partner interface on the management gateway and enables service for high volume, high bandwidth services for a specific customer for a specific market or markets, the management gateway may instruct the P-PLMN-LG to generate a specific PLMN selection and roaming list to specifically enable the wireless user equipment device's scanning function to select the specific MCC and MNC of the specific markets enabled by the partner.

This enablement could be done using one of several mechanisms contained within the SIM and wireless device and also in conjunction with other network elements in the wireless network. One way to use the SIM to enable operation on a specific network is to place the partner operator's MCC and MNC in a Home PLMN list ("HPLMN") or in an Equivalent Home PLMN list ("EH-PLMN"). Whenever the target MCC and MNC is available, it is typically selected if this method is used. Another method is to place another operators' MCC/MNC within the same footprint in the forbidden list (in some installations it actually may be the converse and the systems competing with the partner may have not have their MCC/MNC in the allowed list) within the HLR/HSS database so that when a wireless device attempts to access the forbidden competing PLMN, the wireless-network response to the registration blocks access with a "PLMN not allowed" response. This automatically results in placement of the PLMN in the "forbidden PLMN" list on the SIM card. Another method to block unwanted access is respond with "No Suitable Cells in Location Area" which places Location Area ("LA") in the PLMN's list of forbidden LA's for roaming purposes, which causes the MS user equipment device to look for an LA that is not in the forbidden LA list.

As described herein, the unique twist introduced above is that the wireless transceiver of a user equipment device may have two personalities, corresponding to two identifiers, such as IMSIs, but only one long range wireless radio (i.e., only one radio for accessing an LTE network). In an example scenario, a first personality assigned to the wireless transceiver is the SIM profile belonging to the MNO selected by the AOEM for providing vehicle-centric service that typically only use low volume and low bandwidth wireless resources. As long as this profile is the only operating profile, the wireless transceiver's operation is controlled by network elements operated by, or on behalf of, the MNO that provided the initial contracted subscription to the AOEM. Typically this SIM profile is the default operating SIM profile for B2B low volume machine-to-machine ("M2M") services and the profile should (but not required to) have M2M roaming service on nearly every possible MNO RAN operating within the normal service-delivery-footprint of the AOEM. While the wireless device has only low volume wireless service, i.e., just standard telematics services or remote control, diagnostics, or reflashing (in other words, vehicle-centric services), the MNO that provided the low volume low bandwidth SIM profile controls roaming using standard techniques familiar with 3GPP operators. That is, the wireless device can roam on any network at the convenience and permission of the AOEM's selected MNO. The selection can be based on price, coverage, company affiliation, or partnership affiliation, or any other reason.

If a user or customer desires HVHB services that are outside of the scope of the normal low-volume telematics services included in the AOEM's telematics subscription, then the customer subscribes to a retail data plan with a local MNO of the customer's choosing. The local MNO assigns a local SIM profile to the wireless device. This SIM profile is assigned using the partner web interface or APIs and it causes the management gateway to manipulate a Subscription Manager Data Preparation platform. The result of the manipulation is to assign a local MNO SIM profile as a "second" profile of the wireless device. The second profile is pushed to the second SIM, or preferably to a second profile location in the eSIM/eUICC of the device, such as a telematics device built into a vehicle, or a user's personal smartphone user equipment device that performs functions of a telematics device while the user travels with the smart phone is his or her vehicle. The subscription manager SM-DP delivers the new profile to a Subscription Manager Secure Router SM-SR for delivery directly to the wireless device.

Instead of disabling the initial profile, which may be referred to herein as the 'anchor MNO profile' ("AMP") AMP, or 'first profile,' and subsequently 'enabling' a 'second profile' that may have been recently downloaded to the wireless device and SIM card, aspects herein 'enable' the second profile in a special way without 'disabling' the first profile to support operation of two active profiles simultaneously.

Multiple profile wireless devices have been contemplated, designed, manufactured and sold for many years. Each is generally classified according to the complexity of the handset. One lower-cost option is called Dual SIM, Dual Standby ("DSDS"). Another more complex solution is called Dual SIM, Dual Active or ("DSDA"). In wireless devices that include only one transceiver, only one of the two subscriptions (corresponding to one of two SIM profiles) may be transmitting or receiving radio frequency ("RF") signals at a given time; these devices are referred to as Dual SIM, Dual Standby devices, because while one subscription is actively transmitting or receiving the other subscription is put on standby. In contrast, in wireless devices that include two transceivers and two SIM cards, the device is referred to as Dual SIM, Dual Active because both subscriptions may be actively transmitting or receiving at the same time, each using one of the two transceivers.

Aspects of the management system described herein support simultaneous subscription operation on a single RAT by using the same radio access technology and spectrum band for both subscriptions that are operating simultaneously. In other words, aspects disclosed herein manage operation of each of a plurality of profiles and subscriptions such that that the user equipment device that contains the multiple profiles and subscriptions operates on the same base station for each subscription simultaneously.

Access control of the wireless device preferably can be controlled through the use of a few different network elements. As mentioned above, the HLR/HSS is a network element that provides ultimate permission for a device to have some wireless functionality in a specific wireless market. Standard 3GPP network roaming methods are not suppressed, but unconventionally, the retail customer's profile (i.e., the aforementioned 'second' profile in the user equipment device, which in the telematics scenario may be a device installed into a vehicle during manufacture, or may be a user's personal user equipment device that couples to a device of a vehicle) becomes the prevailing profile in the user equipment device. Thus, the SIM subscription provided by the local MNO providing the retail subscription services becomes the dominant subscription in the user equipment device. The PLMN list controlled by, and provided by, the local MNO providing the retail subscription is the PLMN list selected as the operational PLMN list in the user equipment device. Selection of a network to use while roaming outside of the retail customer's 'home' market is normally (but not necessarily always) done according to the PLMN list stored in the user equipment device. Thus, the 'first' subscription of the SIM, the subscription provided by the MNO that is chosen by the AOEM, becomes the recessive SIM subscription. Wherever the dominant SIM subscription operates, the recessive SIM subscription will operate.

In order to manage two different classes of service on a single operator's network, a different SIM subscription and APN is preferably assigned to low volume service than the SIM subscription and APN assigned for high volume service. Access by a user equipment device for low volume service uses one global APN that will preferably route data access from the SGW in the roaming market networks (roaming with respect to the first recessive SIM subscription and corresponding recessive MNO) to the PGW of the MNO holding the subscription contract for AOEM services. If low volume services are enabled for a specific wireless device and a specific SIM, then the APN for the endpoint in the AOEM MNO's PGW is specified in the HLR/HSS subscriber record of that MNO. If low volume services are disabled for a specific wireless device and a specific SIM, then the APN for the endpoint in the anchor operator's PGW is not specified in the HLR/HSS subscriber record. If high volume services are enabled for a specific wireless device and a specific SIM associated with a retail data plan, then a second APN for the endpoint in the partner MNO's PGW is specified in the HLR/HSS subscriber record belonging to the partner MNO contracted by the retail customer. An HLR record may be a subset of the HSS record (3GPP TS 23.008 specifies the database structure of an HSS record. The HSS subscriber record has a list, or a pointer to a "list of authorized visited network identifiers," that identify(ies) the roaming partner/operator's network identities. Each possible roaming partner preferably should be listed in this list. A network identifier is identified with a network identifier type, for example 'home PLMN', 'home country', or 'visited PLMN'. Alternative implementations may have multiple lists, for H-PLMN and V-PLMN. Without respect to the exact implementation, visited networks are identified as belonging to a group associated with the H-PLMN and another set identified as belonging to a group associated with the V-PLMN. Since there are two SIM profiles, one for the anchor MNO and another for the retail MNO, two different sets of PLMNs are populated in each respective HLR/HSS and for uninterrupted telematics operation, at least the anchor MNO's HLR/HSS contains a matching set of PLMN identifiers that correspond to the set of PLMN identifiers that the retail MNO will allow operation on. Ideally, the anchor will support universal roaming on all MNOs that are candidate MNOs offering retail data services to customers as well as all partner networks offering roaming service to those candidate MNO's customers.

Another set of lists associated with each subscriber in the HSS is part of the 'Operator Determined Barring General Data'. This list contains an authorized list of APNs for each subscriber called the 'W-APN Authorized List'. It is standard and customary for the W-APN Authorized lists to be categorically identical among types of customers. For example most customers would have access to a single APN, named, for example, 'HomeOperator.MobileCountry.Broadband'. This APN may provide Internet access to the home/anchor operator's PGW and to the Internet access endpoint of the home/anchor operator. If a SIM/subscriber belongs to a machine-to-machine group, for example the above described telematics use case, the HSS entry for the W-APN may not include standard internet access at all, but only access to an endpoint that is connected to the automaker or the TSP. It might be named 'HomeOperator.MobileCountry.GM' or 'HomeOperator.MobileCountry.Ford'. The definition and structure of an APN is defined in 3GPP 23.003. Associated with each W-APN in the Authorized List is a W-APN Barring Type. Values to allow access to the specific APN are: allow access to the W-APN whether it is located in VPLMN or HPLMN; prohibit access to this HOME APN when in a VPLMN; prohibit access to the VISITED APN when in a VPLMN; prohibit access to the HOME APN when in a HPLMN and lastly prohibit access to public internet through any W-APN regardless of whether the subscriber is in a VPLMN or HPLMN.

Strategically naming network identifiers in the "list of authorized visited network identifiers" as HPLMN and VPLMN in conjunction with the allowed access point name will allow the HSS to enable a SIM/subscriber, regardless of whether it is in a home market or a visited market, to access the high volume, high bandwidth services in those places where the SIM/subscriber has subscribed to local internet access using local breakout and it will allow global access to low volume diagnostics, firmware reflashing and remote control globally. This is an example and the APNs allowed could easily be reversed to allow global access to the internet and only local access to low volume diagnostics, firmware reflashing, and remote control.

Another method that can be used to manage network access across multiple operators and multiple geographies or countries is to allow every APN in the HSS to have a different entry in the Subscription Profile Repository [SPR], the database used by the PCRF to provide different rules depending upon the specific operator and country. The functions of the Policy and Charging Control Architecture are defined in 3GPP TS 23.203. The advantage of using the PCRF is that a single APN with access to the Internet can be used for all packet data access to the external sources with policy and charging applied on a per service flow or on a per application. The PCRF allows extremely flexible control and charging for devices, in both the home and the visited markets. Setting "Service Data Flow Filters" allows individual services to be identified and controlled over a single APN if appropriate. TS 23.203 described ways of categorizing different types of traffic, for example using specific ports for low volume telematics traffic. Modifying the PCRF allows the HLR/HSS and SIM values described above to remain constant among all subscribers of a group, while granting individual permission to use certain services. Multiple APNs can be supported in an environment where the PCRF is the primary controller of access to network usage.

A third possible method of managing network access is by using an intelligent Diameter Routing Agent ("DRA") with roaming network access control functions. The use of a DRA to control roaming is a new concept being promoted by several of the new DRA solutions. In this model, the DRA 'intercepts' messaging from the external roaming partners and rejects operation on networks except for a targeted roaming network. In the example above with three operators A, B and C, if the partner network A is the network that the customer chooses as his provider for high volume, high bandwidth service, the DRA can 'intercept' messaging from partner networks B and C and provide 'forbidden PLMN' (or similar) response message to populate the 'forbidden PLMN' locations in the SIM card. A company called Evolved Intelligence, based in Bristol UK offers an exemplary solution called Complete Control that intercepts incoming diameter/SS7 messaging and blocks roamer access to the network operators who operate networks opposite of the specific selected partner for high volume services. Low volume services in an area where driver/operator/owner associated with a given vehicle user equipment device does not select a high volume high bandwidth service provider can operate on any available network as long as the anchor has an acceptable roaming agreement for low volume services. Ideally, the wireless device will select the operator with the best network coverage or the preferred operators based on the ordering in the preferred PLMN list contained in the SIM card.

The overall system may operate with one or more of the methods described above, the HSS-based steering, the SIM-based steering, the DRA-based steering or Policy Charging and Control management or it may operate in a system that uses a combination of the above systems to deliver the appropriate network access to provide services that are financially attractive for the driver/customer to use. An example of the details of the solution might be to offer customers of a car company, for example Mercedes Benz, to offer wireless hotspot and streaming audio in their cars. In the example, supplying these services in all geographies in the United States with an AT&T or Verizon SIM is pretty easy. Globally AT&T and Verizon have a nearly ubiquitous footprint that operates with a single data plan and a single subscription to cover the entire United States. Considering customers based in Canada, there are operators that provide similar capability, independently from each other and like the US, the operators there arrange with other operators for coverage with that Canadian SIM where the operator who provided the SIM does not have coverage.

From a car owner's viewpoint, the car owner could subscribe with Telus for additional data services if Telus is the operator that the automaker selected to provide the SIM. This solution works for the Mercedes car owner who is also a Telus customer, but is not optimal for Mercedes car owners who happen to be customers of Rogers or Bell Canada for their smartphone services. The Telus SIM has limitations on it to preclude operation on other networks where Telus operates the RAN. Rogers and Bell Canada, as competing operators are unlikely pay Telus for their own customers to roam on Telus network and consume high volume, high bandwidth data. The Mercedes car owner must subscribe to an additional data plan with Telus (or possibly Mercedes as a data reseller) that operates on Telus network, with its associated costs and breakage of the new plan, unless the customer happens to have independently selected Telus for wireless services for the customer's handset. In the case where the customer has an existing relationship (or a new one, for that matter) with the same wireless operator as the automotive OEM has selected there is an opportunity for splitting the bill between customer facing services and OEM vehicle centric services. If the Mercedes car owner has no existing relationship with Telus, it is absolutely necessary that the customer either sign up for data services with Mercedes (the OEM), TSP or Telus (wireless operator) that provides Mercedes (the OEM) connectivity and SIM.

Suppose for example, there are three wireless operators operating RANs and consumer wireless services in Canada (in actuality, there may be more). Those operators are Telus, Bell Canada and Rogers. For an AOEM, selecting a SIM from any of the three might be undesirable because each of the three operators provides roughly one-third of the wireless telecommunications connectivity for retail customers in Canada. Each operates a similar network and there may be overlap in some places, but in other places there may be coverage by only one of the three operators. For telematics, selecting one will be exclusionary to at least two-thirds of the customers for high volume, high bandwidth data, from a split billing combined bill perspective, and for some, from a geographic coverage perspective. Typically, there will always be areas where one operator provides better coverage than another. From the perspective of the automobile OEM, it would be ideal to be able to provide low volume services on any of the three, and on the one specifically that provides the best coverage where the vehicle is located. Selecting a neutral fourth party SIM that has roaming coverage on each of the three, with the coverage set to utilize standard 3GPP network selection without any predisposition to select any one or the other of the three operators would be the best solution. That ideal 'fourth' party might be Verizon or AT&T where the SIM operates on all three networks without bias to one of the others.

Low-volume vehicle-centric services are only part of the problem. Ideally, high volume, high bandwidth services could operate on the best operator as well. Internet of Things ("IoT") device roaming has been structured by the wireless industry to minimize the monthly reoccurring charge and maximize the per-minute airtime and per-megabyte data rates. This model strongly favors low volume services typically found with IoT devices but it has a strong negative affect on high volume, high bandwidth consumer facing services. This has been planned by the wireless communication industry—one operator wants to maximize its own revenue opportunities with its own customers. This operator does not want to share the retail customers who came at a high acquisition cost, with outside wireless providers, or, for that matter with automobile OEMs.

One method currently used in the vehicle industry is to provide a SIM card for a second GSM-2G/3G/4G wireless transceiver mounted in a car and designed specifically for customer centric services. As mentioned earlier, this is a very expensive solution. Another solution is for the automobile OEM to sell data connectivity to his customers directly. This solution is not in the best interest of the wireless network operator as the wireless customer relationship is shared with another company that can move the service away from the initial wireless network operator. The best way is for the anchor network operator who has the relationship with the automobile OEM to steer the customer facing wireless traffic to the network chosen by the driver/consumer. This solution assumes that the driver/consumer knows where he principally travels and assumes that he select the wireless network for his own handset/smartphone/personal user equipment device that provides the best coverage in the geography where the driver/consumer principally spends his time. Further, in selecting the wireless operator, the driver/consumer may make a conscious trade-off between coverage and cost, at the expense of coverage to some degree, to select the correct wireless network operator and network coverage that fits the driver/consumer's own budget.

Since current technology does not support splitting simultaneous wireless coverage between two operators using a user equipment device having only one cellular transceiver, all service, including vehicle-centric OEM services, must be moved to the wireless operator that the driver/consumer selects. For the OEM, as long as the vehicle has adequate coverage most of the time, and unless the driver/makes a poor choice of wireless operator network, the vehicle will have coverage most of the time on the driver/customer selected wireless operator's network.

Working on the premise that the wireless operator who provides the SIM has universal access to all operators and reasonable rates for low volume data usage, this solution should work as an acceptable method to provide high volume, high bandwidth customer-centric service.

The interface to the management platform allows a SIM to be defined by IMSI, ICCID, IMEI, VIN, MSISDN or any other identifier that uniquely identities a device in a mobile network that can be agreed upon by users/network operators. The identifier may reference a database entry that will include a few data fields that identify the operator selected by the driver/customer as his, or her, desired network operator for a selected geography. It is possible to select multiple operators in multiple geographies, but it is not desirable to be able to select multiple operators in a single geography, although it is possible; such multi-operator selections is prioritized in PLMN lists. Additionally, for each network operator named in a SIM-profile database, an IMSI, and an MSISDN are entered by the partner network operator.

A partner network operator configures, through the API or HTML interface, access to the record of his prospective driver/customer, using the identifier, preferably ICCID or VIN, which has been pre-populated by the management platform's operators and the automotive OEM. The ICCID/VIN is associated with, and identifies, the record entry and the partner network operator actor (i.e., employee of network chosen but the end-user), by virtue of his login credentials, can only populate certain information into the database, controlling only customer service while not affecting any other information within the database. The partner operator actor cannot affect, or modify, basic OEM service and he can only affect customer service for the partner network operators own MCC/MNC. The partner operator actor may enter an IMSI into an IMSI field associated with his employer's network's MCC/MNC. The IMSI is within a range, or ranges, associated with the partner network operator. The partner operator actor enters an MSISDN into the MSISDN field associated with his own MCC/MNC. Additionally, the mobile network operator can select options that allow these credentials using its IMSI and MSISDN to operate in other markets as secondary, valid roaming markets, where the partner network operator has agreed with the driver/customer that the partner network operator will be responsible for providing roaming service and will be financially responsible to the third roaming network operator for the roaming service consumed by the driver/customer. The driver/customer will be responsible to the partner network operator for roaming service charges for data and/or voice service incurred in this third market.

GSMA has developed RSP Architecture Version 1.0 dated 23 Dec. 2015 and RSP Technical Specification Version 1.0 dated 13 Jan. 2016. This specification generally outlines a method for distributing a SIM card token (digital SIM card subscription). This architecture was designed for a new generation of smaller, lighter, mobile-connected devices that are too small to support a changeable SIM device. The process starts with a consumer buying a device and then going to his selected wireless operator and purchasing a voucher. The voucher is purchased on the consumer's existing contract or the consumer negotiates a new contract. The voucher may be on a plastic card (like a credit card) or on a printed page containing a bar code and a QR code. The bar code contains the ICCID (similar to the above, and in general, mathematically related to the IMSI) and the QR code and a scratch label with a PIN and PUK contained hidden. The bar code (IMSI) is connected to the contract at the point of sale. After purchasing the card or page from the retailer, the consumer can, at his own convenience utilize a smartphone application to pair with the target device and his smartphone (using short range wireless services like Bluetooth or WiFi) then scan the QR code. The smartphone app connects to a backend system. The backend system creates an eSIM profile and encrypts that profile and subsequently downloads the eSIM profile to the smartphone. The eSIM profile is downloaded from the smartphone to the target device and the software on the device activates the target device.

The just-mentioned voucher and SIM token distribution process facilitates device activation and download of eSIM profiles. In addition, SIM token distribution creates a customer SIM and device profile attached to a customer subscription and account. A user's automobile could be a target device and the user could pair his, or her, smartphone using Bluetooth or WiFi to the automobile and subsequently push an eSIM profile directly to an automobile. This accomplishes the solution of creating a wireless service for customer facing services, but it lacks the functionality for the OEM facing services. Specifically, it lacks the methods for allowing the OEM to communicate directly to the vehicle from the OEM backend. It lacks the necessary security normally associated with dedicated APN services for OEM services. It also lacks the functionality for the driver/customer to split the bill with the OEM, with the OEM paying for the OEM portion of the bill. But it does have one important function. It pulls an eSIM profile from the driver/consumer's selected wireless operator. The eSIM profile contains the ICCID, IMSI and MSISDN. These are the key elements that must be populated by the wireless network operator into the partner-operator database portion of the management platform.

The standard solution and mobile application (smartphone app) can be modified specifically to support the disclosed management platform to eliminate the heavy lifting done by the IT department of the driver/customer's selected mobile network operator. The selected mobile network operator would be required to operate the eSIM Profile and Voucher Generator. A modified smartphone app may be operated specifically for the management platform and the automobile OEM. This app may capture the eSIM profile, much the same way as it currently captures the eSIM for a small wearable device. Instead of connecting via Bluetooth or WiFi to a small wearable device, the smartphone may connect to the disclosed management platform Profile and Voucher Subscription Converter ("PVSC"). The PVSC will manipulate the Provisioning and SIM Management platform disclosed herein to install the necessary eSIM credentials to facilitate the operation of driver/consumer facing data services. Those credentials are loaded into the database using the identifier for the vehicle which could be, as described above, the VIN, IMSI, ICCID, or other wireless device identifier along with the IMSI (or ICCID) and MSISDN received through the voucher. The IMSI and MSISDN received from the voucher are installed as the second profile IMSI and second profile MSISDN.

SUMMARY

A user equipment device comprises a memory portion that contains a first identity profile for use in accessing a first class of service and a second identity profile for use in accessing a second class of service, and a processor configured to manage the transmission of a first context traffic flow having the first class of service over a mobile network according to the first identity profile and to manage the transmission of a second context traffic flow having the second class of service over the mobile network, simultaneously with the transmission of the first context traffic flow, according to the second identity profile.

Data traffic associated with the first and second context traffic flows may be processed by a single wireless transceiver simultaneously.

Data traffic associated with both of the first and second traffic flows may be routed to a single mobility anchor of a mobile network with which the single wireless transceiver is in communication with. The mobility anchor may be a serving gateway of the mobile network.

The processor of the user equipment may be further configured to distribute portions of the second context traffic flow by directing a first portion of the second context traffic flow to a first subcarrier transmit circuit of the device and by directing at least a second portion of the second context traffic flow to a second subcarrier transmit circuit. In an aspect, the processor may only distribute to the first subcarrier transmit circuit and to the second subcarrier transmit circuit the first and second portions of the second context traffic flow for transmission when no portion of the first context traffic flow is being transmitted.

The first and second context traffic flows may both be transmitted in the same band of wireless spectrum.

The processor of the user equipment device may be further configured to cause the first transmit circuit and the second transmit circuit to transmit the first portion and second portion of the second data session traffic flow, respectively, on sub carriers that are not spectrally adjacent to each other.

Each of the first identity profile and the second identity profile may be associated with a different long-range wireless network than the other.

The processor of the user equipment may be further configured to necessarily cause the first context traffic flow to follow a handoff from a first wireless cell to a second wireless cell so that a handoff of the first context traffic flow necessarily follows a handoff already completed of the second context traffic flow from the first wireless cell to the second wireless cell according to the second identity profile.

The memory portion of the user equipment device may be a single SIM that stores both the first and second identity profiles.

The first and second transmit circuits may each or both be virtual transmit circuits that use a single hardware circuit, wherein the single hardware circuit uses a single digital to analog conversion module for transmission of the first and second portions of the second context traffic flow.

The user equipment device may report that the second wireless cell is the only cell that can support an acceptable data communication session for the first context data flow, even if a cell other than the first cell or the second cell could support an acceptable data communication session for the first context data flow. The first and second context data flows may be EPS bearers.

A provisioning, analytics, and management platform ("PAM") comprises a processor configured to provision a second identity profile as a dominant identity profile into a user equipment device that has been provisioned with a first identity profile, wherein the first and second identity profiles are each unique and are both associated with the user equipment device. The user equipment device may be programmed to always cause a handoff procedure of a second context traffic flow associated with the second identity profile from a first cell to a second cell before a handoff of a first context data flow that is associated with the first identity profile can occur from the first cell to the second cell, and the user equipment may be programmed to report measurements during the handoff procedure that the second cell is the only cell that can support an acceptable data communication session for the first context data flow. Such reporting may occur even if other cells could acceptable support the first context data flow. By suppressing the reporting of cells other than a cell that the second context traffic flow has already been handed off to ensures that the context corresponding to the first identity profile is always handed off to the same cell that the second context data flow is handed off to.

The provisioning, analytics, and management platform may cause that the user equipment be programmed to report measurements during the handoff procedure that the second cell is the only cell that can support an acceptable data communication session for the first context data flow even when measurements taken by the user equipment device indicate that at least one cell other than the first cell or the second cell could support an acceptable communication session for the first context data flow, by causing the user equipment device to flag, or designate, the second identity profile as dominant with respect to the first identity profile, which would thus be recessive with respect to the second identity profile.

A method comprises receiving provisioning of a second identity profile. The provisioning may be received from a PAM by a user equipment device. The method also comprises receiving provisioning of a first identity profile; designating the second identity profile as a dominant identity profile with respect to the first identity profile; managing a handoff of a second context traffic flow that corresponds to the dominant profile based on measurements that indicate that a new second cell will provide better performance that a current first cell, and managing a handoff to the second cell of a first context traffic flow that corresponds to the first identity profile based on the handoff of the second context traffic flow to the second cell.

The second identity profile referred to in the method may be a high bandwidth class of service identity profile and the first identity profile may be a low bandwidth class of service identity profile. The second cell may be reported in a measurement report associated with the first identity profile as the only cell that can acceptably support the first context traffic flow if it were handed off from the first cell. Such reporting of only the second cell as being acceptable may be performed even if at least one cell other than the second cell can acceptably support the first data traffic flow after handoff from the first cell.

BRIEF DESCRIPTION OF THE DRAWINGS

FIGS. 6a-6e illustrate steps of a UE profile negotiating and completing a handoff from one wireless cell to another.

FIGS. 7a-7g illustrate steps of a UE having a dominant profile and a recessive profile negotiating a handoff where the recessive profile necessarily follows the dominant profile from one wireless cell to another.

FIG. 14 illustrates a block diagram of a UE with single radio circuitry that facilitates transmitting two separate identity contexts simultaneously.

DETAILED DESCRIPTION

As a preliminary matter, it will be readily understood by those persons skilled in the art that aspects described herein are susceptible of broad utility and application. Many methods, embodiments, and adaptations other than those herein described as well as many variations, modifications and equivalent arrangements, will be apparent from or reasonably suggested by the substance or scope of the aspects described herein.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Figure 1:
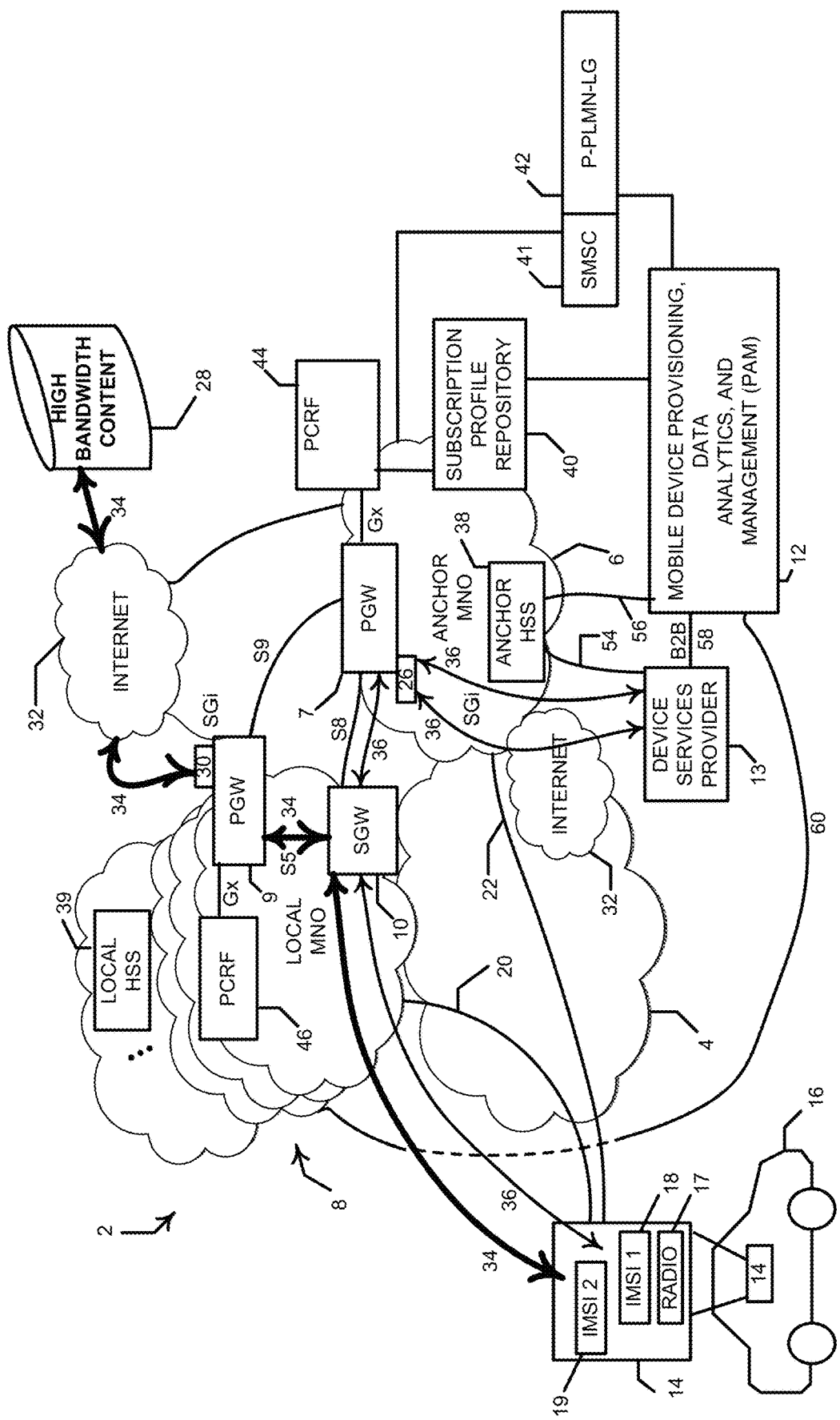
FIG. 1 illustrates a network system diagram of components for managing the transmission of low and high bandwidth traffic over a mobile network.

Turning now to the figures. FIG. 1 illustrates a network system diagram of components for managing traffic between a single-radio device and multiple content providers over multiple mobile networks using different subscriber identities and corresponding profiles simultaneously. A communications network 4 may include wireless communication networks, such as 3G, 4G, LTE, CDMA, etc., and wired, or wireless, links that connect, and provide interfaces to, components thereof. An anchor communication mobile network 6 having anchor packet gateway 7, and a plurality of local mobile networks 8, each having a local packet gateway 9 and local serving gateway 10, operated by an anchor mobile network operator ("MNO") and one of a corresponding plurality of local MNOs, respectively, are shown as a separate networks that overlap with communication network 4. However, it will be appreciated that a single cloud may be used to collectively represent one or more communication networks for purposes of clarity. One of the plurality of local networks 8 may be a preferred network of a preferred network operator of a consumer (e.g., a network that a consumer pays for monthly mobile phone/device service for a personal user device.)

System 2 includes a data analysis and management platform 12, which may be referred to as a provisioning, analytics, and management platform ("PAM") that couples with, is part of, or is in communication with, anchor mobile network 6. Anchor mobile network 6 may be associated with a device services provider 13, that provides services, over-and-above network and connectivity services, to wireless machine devices, such as telematics devices, or other Internet of Things ("IoT") machine devices, represented by telematics device 14 shown located in vehicle 16 in the figure. Machine device 14 is shown with a single radio transceiver 17, that typically includes an antenna, filters, radio frequency frontend circuitry, etc. A machine device, such as 14 typically has a unique identifier associated with it that uniquely identifies it, or a subscriber associated with it. For example, a mobile user equipment device ("UE") such as a user's smart phone, or a machine device, such as telematics device 14 associated with vehicle 16 typically includes a International Mobile Subscriber Identity ("IMSI") 18, which is a unique identifier that comprises a country value (typically referred to as a mobile country code ("MCC") that uniquely identifies a country that a mobile operator operates in), a network operator value (typically referred to as a mobile network code ("MNC") that uniquely identifies a mobile network services provider/operator), and a subscriber identity value (typically referred to as a mobile subscription identification number ("MSIN"). Together, the country value, the network operator value, and the subscriber identity value compose IMSI 18.

Machine device 14 may communicate via preferred network 8 as shown by wireless link 20, or with anchor network 6 as shown by wireless link 22. Links 20 and 22 merely illustrate that when device 14 communicates via communication network 4, it typically has a wireless link to a particular wireless network, (i.e., preferred network 6 or anchor network 6, respectively), depending on its location (i.e., whether it is within range of a wireless transmit/receive node, such as an eNode B ("eNB") in a Long Term Evolution ("LTE") network).

In a typical scenario where device 14 is a telematics device in a vehicle, device services provider 13 may be a telematics services provider that may wirelessly provide, or manage, services to vehicle 16, and user/occupant devices (such as wi-fi hot spot service, over-the-air software updates to various components and modules of the vehicle that may be connected to the telematics device via a vehicle communication bus, such as a Controller Area Network ("CAN") bus) located therein. It will be appreciated that some services, such as over-the-air updates of software, automatic crash notification messaging, and voice communication from vehicle 16 between an occupant of the vehicle and a live operator are relatively infrequent compared to a user's in-vehicle internet browsing and streaming. These infrequent types of services may be referred to herein as vehicle-centric services that are typically low bandwidth or low data types of services, while internet browsing, music streaming, video stream, document downloading, e-mail messaging, SMS messaging, and the like, may be referred to as consumer services, that are often data-intensive as compared to the vehicle types of services that infrequently occur between vehicle devices and a telematics operator either directly or as an agent for a vehicle original equipment manufacturer ("OEM").

A telematics services provider may have arranged for its networking equipment 13 to use endpoint 26 of anchor network 6 to transport vehicle-centric services while a consumer may have arranged for his, or her, smart phone table, or other wireless devices, to use local network 8 to transport consumer services, which may be delivered from a content provider server 28 that stores and typically provides music, video, e-mail, or cloud storage documents, to a user device. In the figure, consumer service content is labeled in bold font as "HIGH BANDWIDTH CONTENT" and a bold flow path 34 is shown between content provider server endpoint 30 to vehicle machine device 14 to highlight that consumer content typically comprises a large amount of data transported over a high bandwidth, high data rate wireless connection compared with vehicle-centric services that typically comprise much lower amounts of data and typically need much lower data rate/bandwidth connections, shown by flow path 36 as non-bold to indicate the lower data requirements. Flow path 36 may occur via an interface with endpoint 26 over the Internet 32, or via a connection other than the Internet, such as, for example, a virtual private circuit using IP protocol. FIG. 1 shows two paths 36 to represent two alternative embodiments of implementing a network connection between a device services provider's equipment 13 with anchor network's equipment 13 for providing device services via the anchor network to vehicle device 14.

Each segment of flow path 34 is shown with a large arrow in the downlink direction and a smaller arrow in the uplink direction to indicate that the high bandwidth traffic flows from a content server 28 toward a user but traffic in the uplink direction from user device 14 to a content server typically is a much smaller traffic flow (i.e., amount of data or data packets). High bandwidth traffic may be referred to as being of a premium class. Management platform 12 logically connects with HSS 38, subscriber profile repository 40, and P-PLMN-LG 42. Subscriber profile repository 40 is shown in communication with PCRF 44 of anchor network 8 and PCRF 44 communicates with PGW 7 via a Gx interface. PGW 7 communicates with PGW 9 via an S9 interface; PGW 9 communicates with PCRF 46 via another Gx interface. It will be appreciated that the interface types discussed are in reference to a LTE network, but that similar interfaces and corresponding protocols may be used between network components that are similar to the ones discussed above.

In addition to identifier 18, machine device 14 as shown in the figure includes a second identifier/IMSI 19. Each of identifiers 18 and 19 may refer to corresponding unique subscriber profiles that are unique profiles, even if they are associated with the same physical person/subscriber in a mobile network operator database such as may be stored in a mobile network's HSS. Each unique subscriber profile, which are each associated with a unique device identifier (typically an IMSI and/or an MSISDN), may be used by device 14 to access either mobile network 6 or mobile 8 for a given data session between the device 14 and either of the mobile networks.

Not only may device subscriber profiles 18 and 19 cause device 14 to conduct a wireless data session with either anchor network 6, or any of local networks 8, device 14 may conduct a first session with the anchor network using one identifier, for example first IMSI/profile 18, and the device may conduct a second data session with one of local networks 8 using second identifier/profile 19 substantially simultaneously with the first. The two disparate sessions may be conducted substantially simultaneously with each other notwithstanding the embodiment shown in FIG. 1 in which device 14 only has one radio transceiver 17. Simultaneous data sessions from device 14 using different subscriber profiles 18 and 19 may be supported by the single transceiver 17 of device 14 when it has an established radio link with one a wireless mobile network.

Figure 2:
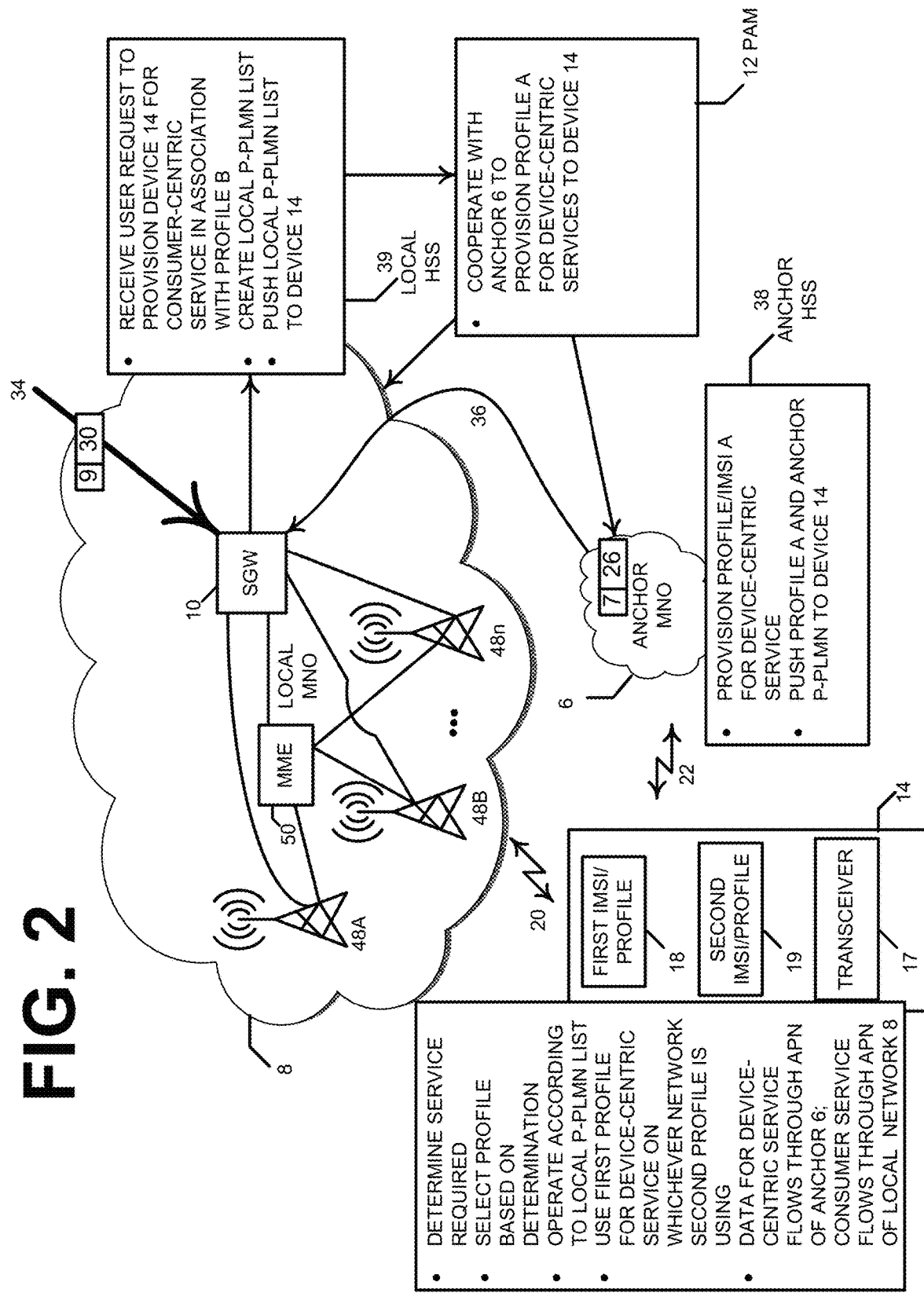
FIG. 2 illustrates a wireless network coverage environment that a user equipment devices ("UE") may be moving within.

Turning now to FIG. 2, the figure illustrates some details of a wireless mobile network environment having a local mobile network 8. A mobile device 14 having first IMSI/profile 18 and second IMSI/profile 19 stored therein, which profiles are unique to the mobile device, may communicate with network 8 over wireless link 20 or may communicate with network 6 over wireless link 22. Network 8 typically includes a plurality of eNodeB stations 48A, 48B, through 48n, which are connected via an S1-MME interface to Mobility Management Entity ("MME") 50. (Network 6 typically will have similar architecture) eNodeBs 48 are also shown each connected via an S1-U interface to SGW 10, which in turn is connected to MME 50 via an S11 interface. SGW 10 typically controls routing of high bandwidth traffic flow 34 and low bandwidth traffic flow 36, from endpoints 30 and 26, respectively, shown in FIG. 1. Endpoints 30 and 26 may have access point names associated with them for use in identifying traffic flow sources or types.

Anchor HSS 38, Local HSS 39, PAM 12, and UE device 14 are shown as enlarged text boxes that include bullet points of functions and operation the respective network elements may perform. It will be appreciated that the functions and operations are described in relation to the elements associated with them in the figure for purposes of description—different elements may perform the functions listed in the text boxes, or other functions, features, and operations may be performed by the illustrated network components, or network components that may not be illustrated, without departing from the functionality of novel aspects disclosed herein.

PAM 12 cooperates with elements of anchor network 8, typically an HLR/HSS, to provision a user equipment device for low bandwidth machine service, such as vehicle telematics service. It will be appreciated that a given UE that is being provisioned by the PAM could also include machine devices for providing portable Wi-Fi service at public social/community events, or a machine UE that monitor other machines where the machine UE may be used to report health, status, or inventory of various machines nearby, such as vending machines, medical equipment, rental vehicles, warehouse inventory, and the like. Such a machine may also be provisionable to support high bandwidth service to multiple users' personal UE devices if the corresponding user, or users, provision high bandwidth service into the machine UE according to aspects disclosed herein. However, for purposes of discussion, machine device 14 is assumed to be a vehicle telematics device installed into a vehicle at the time of vehicle manufacture, and is typically provisioned via cooperation between PAM 12 and anchor network 6 that the vehicle manufacturer, or telematics services provider, has established as the network for performing low bandwidth telematics services.

Upon provisioning the UE, and corresponding low bandwidth identity and profile corresponding to the vehicle, into a table at the anchor network's HSS 38, the identity (referred to herein as a first profile) is 'pushed', or transmitted, installed, or otherwise loaded into UE 14 for storage in a memory portion that may include a SIM, as well as a P-PLMN list that provides the UE with network priority for use in determining a network to attempt to connect to when multiple network signals may be available to the UE, as discussed elsewhere herein.

Continuing with the vehicle telematics scenario, when a buyer purchases a vehicle into which UE 14 has been installed, the vehicle owner may select, using a web browser interface for example, their own personal wireless network provider as a preferred network provider for wireless service that supports their personal web surfing, document downloading and uploading, video and picture sharing, and the like, from the vehicle, where the vehicle owner, or vehicle passengers, may use UE 14 as a wireless hot spot that provides long range wireless connectivity to the Internet, or other similar network, via a wireless mobile network. In the example scenario, the user selects local network 8 as his, or her, personal-use wireless provider, and local HSS 39 provisions this selection and generates an identity profile, referred to herein as a high bandwidth second identity/profile different from the identity profile that was generated by the anchor network HSS 38, and that includes information relative to the user-selected preferred wireless network. The second identity is loaded into UE 14. UE 14 is configured to determine that the second profile is to be used for high bandwidth services, and that the second profile is to be used for connecting to RAN as the vehicle it is part of travels.

A processor of UE 14 flags the second identity profile as the 'dominant' profile and flags the first identity profile, which is the profile associated with the telematics services, as a 'recessive' profile. Thus, whenever UE 14 operates to support data service flows, it uses the dominant second profile, and information associated therewith, such as IMSI, for high bandwidth data flows and the UE uses the recessive first profile for low bandwidth telematics services. Information associated with the profiles may include an APN that is used for determine whether the UE is attempting a high bandwidth or a low bandwidth wireless network access.

Figure 3:
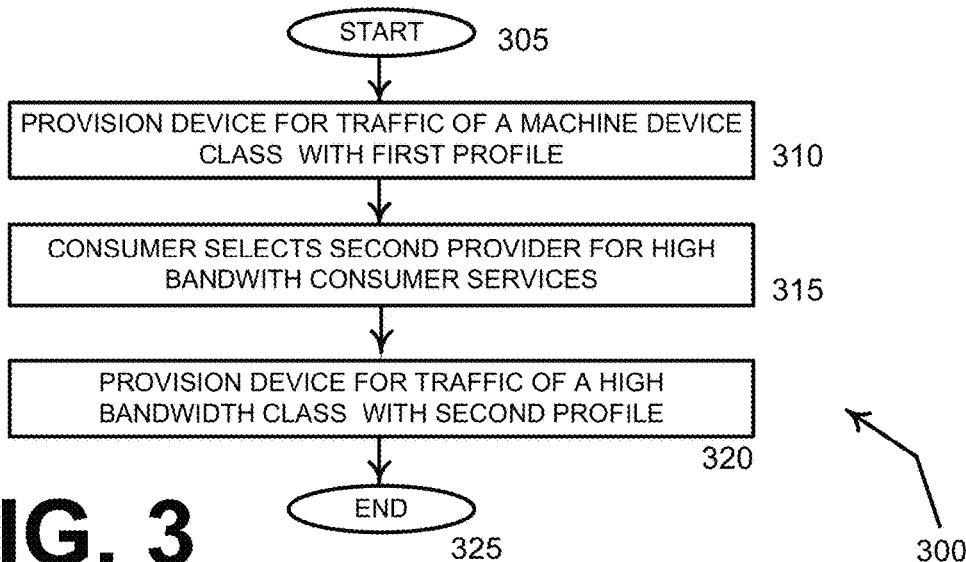
FIG. 3 illustrates a flow diagram of a method for provisioning a UE.

Turning now to FIG. 3, the figure illustrates a flow diagram of a method 300 for provisioning a user equipment device ("UE"), such as a machine-to-machine device, a device in a machine, such as a telematics device in a vehicle, a user's smart phone or tablet, and the like. Method 300 begins at step 305. At step 310, provisioning information is generated, typically by a wireless mobile network, such as a cellular telephone/data network. The provisioning information may include a subscriber profile and may include a device identifier, such as an IMSI. The device identifier may be stored, along with corresponding profile information in a subscriber identity module, in a memory portion of the user equipment, and may be a physical card that the user equipment device contains, or may be data stored electronically, typically in nonvolatile memory, in the user equipment. The provisioning information may include information such as account information, security keys and other security information used for securely conducting a wireless communication session, a user's PIN for unlocking the device for use, unique identifiers, such as an IMSI and a serial number of the SIM itself in the case of a physical SIM card, and other information that may be used to improve wireless performance of the device as it conducts a wireless phone call or data session. The provisioning information may include a preferred PLMN list that prioritizes selection of networks to connect with when a plurality of networks is available for the UE to connect to. In addition, the provisioning information may associate a particular class of service with a particular network. The particular class of service and associated particular network may be associated with an APN such that when setting up a context with an APN through which data for the context will pass, the APN may be used to identify the class of service. For example, if low bandwidth telematics service, or low bandwidth machine health information, is an intended use of the UE, and the low bandwidth service will be provided through a particular network's APN, then the UE may recognize the APN while setting up a low bandwidth context and automatically select a first profile that is associated with the low bandwidth context.

Although a given device may be intended for providing machine device services, or similar low bandwidth services that typically are provided via a predetermined network, an end user may wish to use the same device for consumer services on a network of his, or her choosing, which may (and almost always will) have a different APN for providing services, which often consume much more network resources (i.e., bandwidth) that the low machine bandwidth service. At step 315 the user selects a network for providing consumer services and at step 320, the UE is provisioned with a second profile that is associated with, and intended for use with, the providing of consumer services. During provisioning of device 14 at step 320, the second profile is designated in the user equipment as being a 'dominant' profile with respect to the first profile, which is designated as a slave, or 'recessive' profile. The designation of dominant and recessive profiles may be stored in a SIM, or in another portion of memory of device 14 that is not used for storing profiles. Method 300 ends at step 325.

Figure 4:
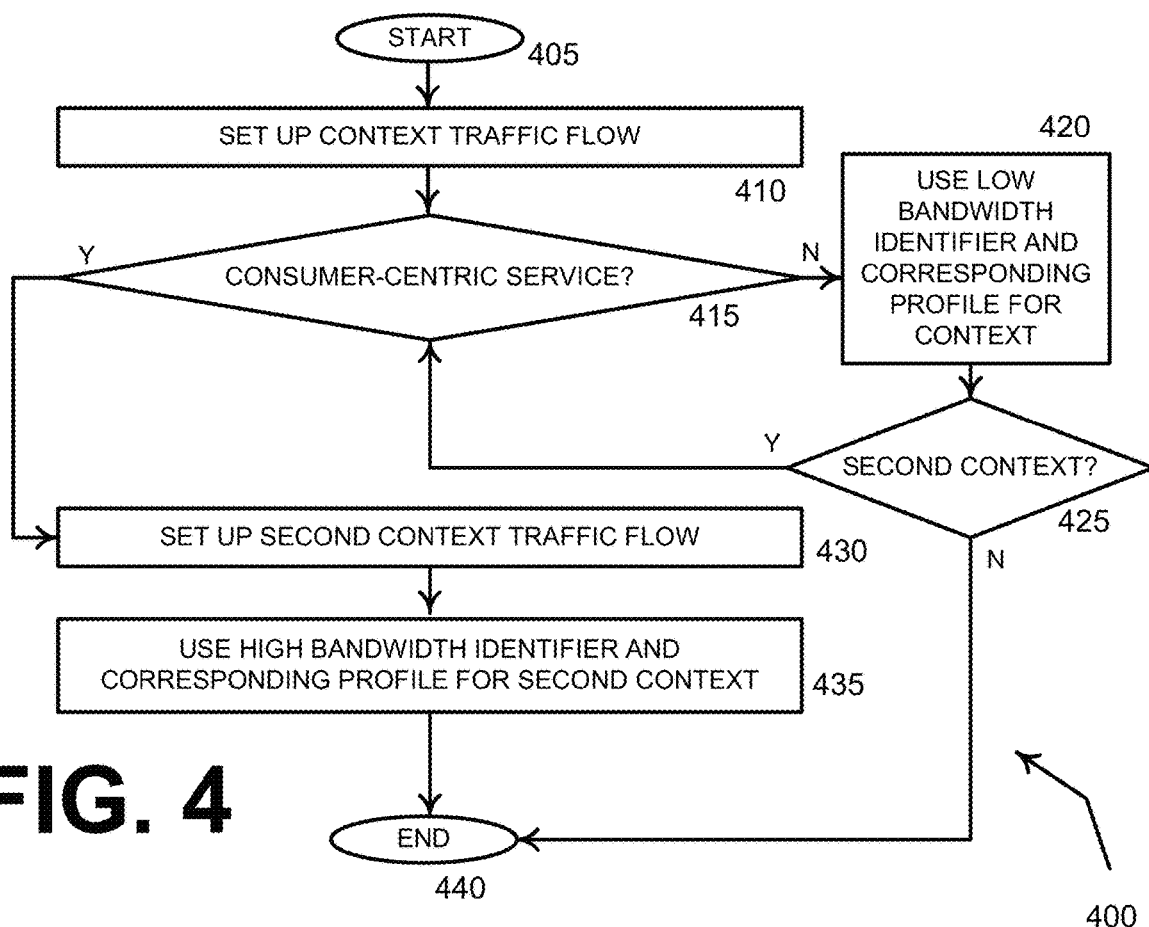
FIG. 4 illustrates a flow diagram of a method for operating a UE with two different contexts simultaneously.
Figure 5:
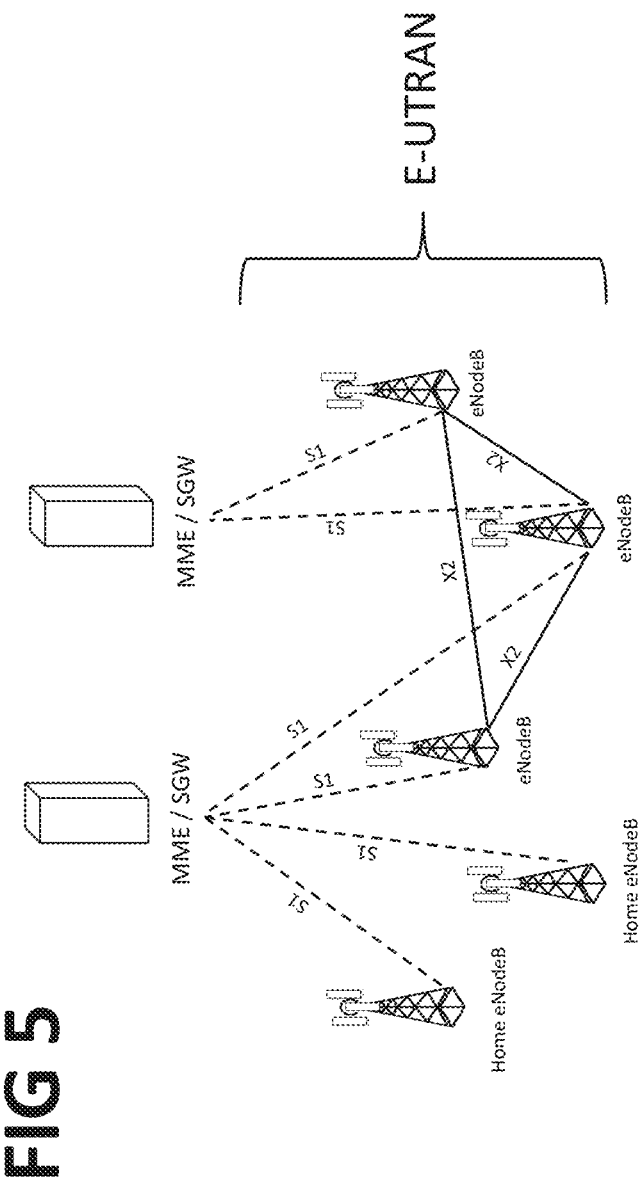
FIG. 5 illustrates a network diagram of a E-UTRAN network environment having a plurality of cell cites in two different radio access networks.

Turning now to FIG. 4, the figure illustrates a method 400 for operating a UE and providing two different contexts simultaneously. Method 400 begins at step 405. At step 410, the UE begins to set up a data session context. The setting up of a context may be triggered by an input from a user of the UE (i.e., the user opens a browsers and attempts to browse an Internet web page), or the UE may receive a request from a machine device services provider's server to establish a data session context.

At step 415, a processor of the UE determines whether the context being set up is to be a high bandwidth session or a low bandwidth session. The determine at step 415 may be made based on an APN, an IP address, an application that the processor is running and that the user of the UE may be using to cause the initiating of the set up of step 410, the expiration of a timer, a message received from a wireless network, or other clues associated with an action at the UE or associated with a message received from the wireless mobile network.

If the determination is made at step 415 that the context being set up is a low bandwidth context, the processor uses a low bandwidth identifier and profile at step 420 for establishing the context. For example, if an incoming message from a telematics services provider requests that the UE receive a software update over the air ("OTA"), the UE uses the IMSI and network information associated with the IMSI in the first profile, or low bandwidth profile, to connect to whichever wireless network is at the top of the P-PLMN list stored in the UE. If another context trigger does not cause the processor of the UE to begin the set up of another context, method 400 ends at step 440.

If another context trigger causes the processor of the UE to begin the set up of another context based on a determination at step 425, method 400 returns to step 425 and the processor in the UE determines whether the context to be set up is a consumer-oriented, high bandwidth context. If the context to be set up is a consumer-oriented, high bandwidth context, method 400 advances to step 430 and the processor of the UE begins the setup of a second context traffic flow. An example of a high bandwidth consumer oriented traffic flow trigger might occur in a scenario where a user opens a web browser using his, or her smart phone, which may be configured to access the Internet via a Wi-Fi, which Wi-Fi hotspot may be provided in the scenario by a telematics device in a vehicle in which the user is traveling. The processor of the UE telematics device recognizes the opening of a browser and automatically uses a second profile and associated information according to provisioning that may have occurred as described above in reference to step 320 in FIG. 3. At step 435 the UE establishes the second context using the second subscriber identifier. Method 400 ends at step 440.

It will be appreciated that FIG. 3 shows and describes using a low bandwidth subscriber identity and profile for a low bandwidth service, and using a high bandwidth subscriber identity and profile for consumer services, which may be, but are not necessarily, high bandwidth context data session flows. Although FIG. 3 does not expressly show or describe simultaneous operation of both high and low bandwidth contexts, the data session established at steps 420 and 435 may occur substantially simultaneously via a single UE, which may be the telematics device installed in a vehicle and that provides Wi-Fi hot spot service to a passenger's smart phone or other device.

Turning to FIG. 6, the figure illustrates connection and session management of a single-profile of a device in an LTE environment. Existing connection and session management illustrates how aspects disclosed herein below in reference to FIG. 14 contrast with existing connection and session management. Connection and session management in an LTE environment is a performed by the Non-Access Stratum ("NAS") protocol between the User Equipment ("UE") and the Core Network ("CN"). Connection and Session management is performed by the Radio Resource Control ("RRC") protocol between the UE and the Evolved UMTS Terrestrial Radio Access Network ("U-UTRAN"). The NAS protocol performs and facilitates services such as authentication, registration, bearer-context activation/deactivation and location registration management. The RRC protocol, more specifically known as the Access stratum ("AS") protocol is used to establish a connection, configure the radio bearers and their corresponding attributes and to control mobility. More specifically, the RRC protocol sets up user data sessions. Once a network connection is established with a UE according to the NAS protocol, the RRC connection is optionally set up. When NAS protocol sets up a connection, that UE state is known as EMM-REGISTERED ("EMM-R"). When in the EMM-R state, the UE is attached to the LTE network and an IP address is assigned to the Evolved Packet System ("EPS") bearer. The Mobility Management Entity ("MME") 'knows' the current location of the UE to the accuracy of a cell, or at least to the accuracy of a Tracking Area ("TA"), which is a group of cells. When a device is EMM-R, mobility and movement within the radio access network is managed by the UE. That is, as stated above, the UE maintains a TA and if the UE travels outside of the TA, then the UE must notify the network of its location with the NAS protocol. No special network management requiring extraordinary network actions are necessary to facilitate movement by the UE outside of an assigned TA. Only two different RRC states are supported; RRC_IDLE ("RRC-I"), where the UE device minimizes network communications, and RRC_CONNECTED ("RRC-C"). The RRC-C state is the state where the network actively manages the connections and mobility. Data transfer occurs in the RRC-C state. Both of these states support device mobility, but each state supports device mobility differently. In the RRC-C mode, active mobility management is required because a data session could be underway and data messages could be in the midst of being sent to or from the device. While the device is in the RRC-I mode, the device itself can do the heavy lifting and maintain the network connection without assistance from network elements. In the RRC-I mode, the UE determines which cell to select next and if necessary the UE updates the network as to its whereabouts based on the assigned TA, which could cover one cell, or a plurality of cells. In the event of mobile-terminated messages, the MME initiates paging throughout the entire tracking area where the UE last reported its presence. In the RRC-I state (or mode), the UE is known in the Evolved Packet Core ("EPC") and the UE has an IP address in the EPC. The UE is not known to be present in a specific E-UTRAN/eNodeB. When the UE establishes a "context" in the eNodeB, it is known as in the RRC-C state. The UE is of course, known to the EPC in both RRC-I and RRC-C states, but the E-UTRAN/eNodeB only establishes positive control in the RRC-C "connected state."

Figure 6A:
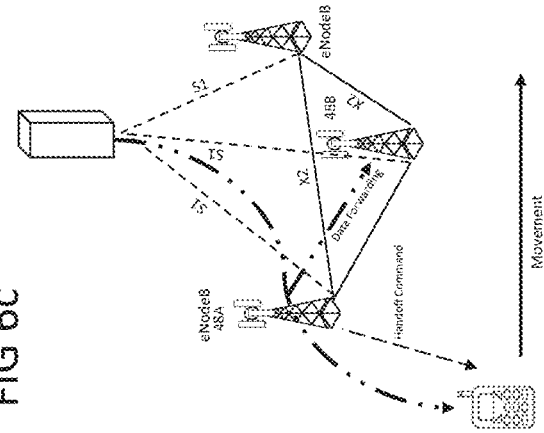

The network manages and controls mobility, but the UE assists with mobility management by providing the network with feedback as shown in FIG. 6a. The UE location is known on a cell level (i.e., the MME maintains current information as to which cell, or eNodeB a UE is connected with).

(To avoid reader confusion, it is pointed out that in the following examples discussed in reference to FIGS. 6a-e and 7a-g, a handoff from eNodeB 48A to eNodeB 48B is described, which is different from the scenario described elsewhere herein in reference to FIG. 2, which illustrates and discusses a handoff from eNodeB 48B to eNodeB 48A.)

Figure 6B:
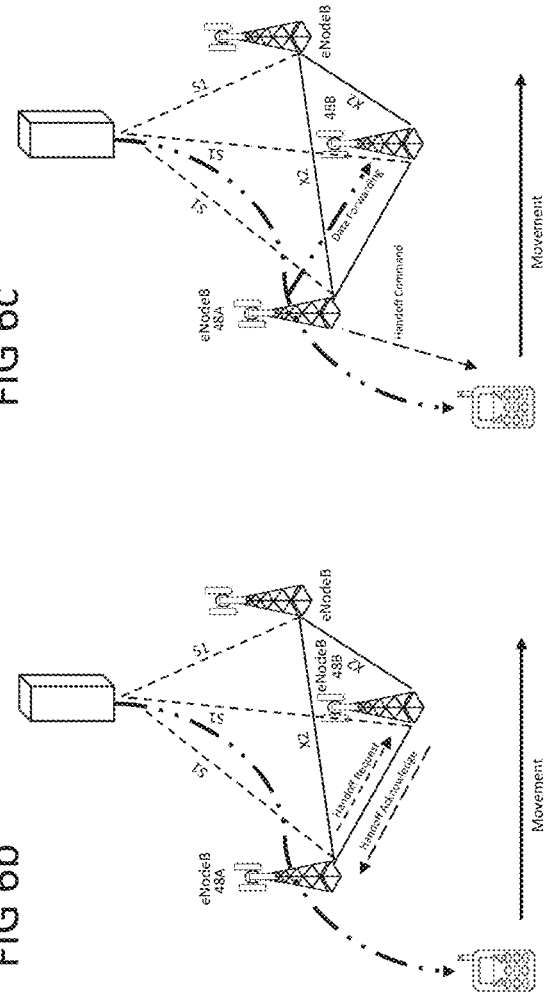
Figure 6C:
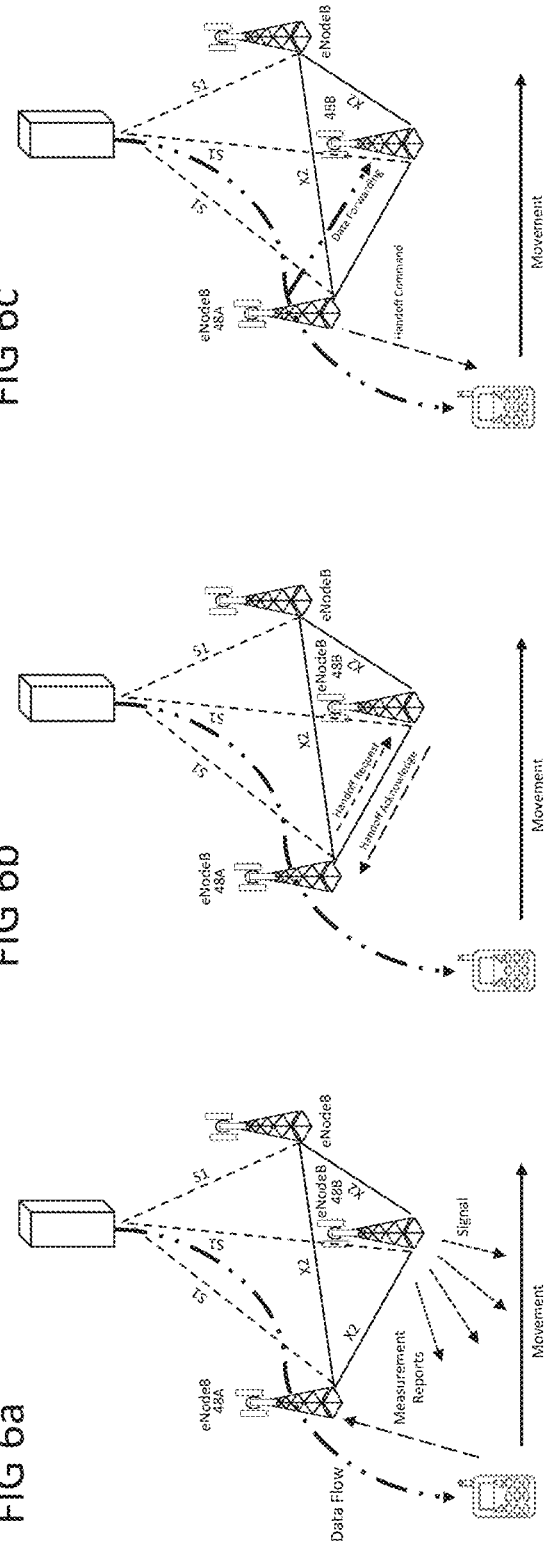

The eNodeB 48A configures the UE to provide regular measurements and the UE regularly reports back to the network as it operates. Based upon the comparing of measurements, including signal strength measurements, with certain corresponding thresholds, the eNodeB 48A arranges for another eNodeB 48B to provide connectivity by using a handoff request to the proposed eNodeB 48B as shown in FIG. 6b. The proposed eNodeB 48B establishes control and responds with a handoff request acknowledge back to the current, or first, eNodeB 48A. The first eNodeB 48A issues a handoff command to the UE as shown in FIG. 6c while the data from the packet session is temporarily forwarded to the second eNodeB 48B, which will be receiving the handoff. As shown in FIG. 6d, the UE confirms the handoff with a confirmation message back to the second eNodeB 48B. The mobile-terminated data begins flowing thru the second eNodeB 48B, with the data initially coming in via a round-about way from the first eNodeB 48A. The second eNodeB 48B requests the EPC to switch the data path to a more direct path from the EPC to the second ENodeB 48B. The Serving Gateway ("SGW") performs its role of mobility anchor for data bearers when a UE moves between eNodeBs (one of multiple roles of the SGW) and completes the handoff by switching the data path as shown in FIG. 6e. Although the call path is heavily dictated by the eNodeB, one can see that the UE provides a significant function. The UE constantly evaluates the network, especially other available cells and is constantly measuring the active eNodeB for signal quality. An important aspect in LTE is that the UE provides a specific potential "next" target eNodeB when the signal levels for the current connection begin to reach marginal status. The threshold is actually set by the serving eNodeB, so there is some control as to when to move to the next eNodeB, but essentially, the UE "asks" for the next eNodeB by name when the UE recognizes, according to the network's standard, that the handoff is necessary to maintain communications. It will be appreciated that the steps discussed in reference to FIGS. 6a-6e contemplate a single UE and a single IMSI/subscriber identity profile that is handed off.

Figure 12:
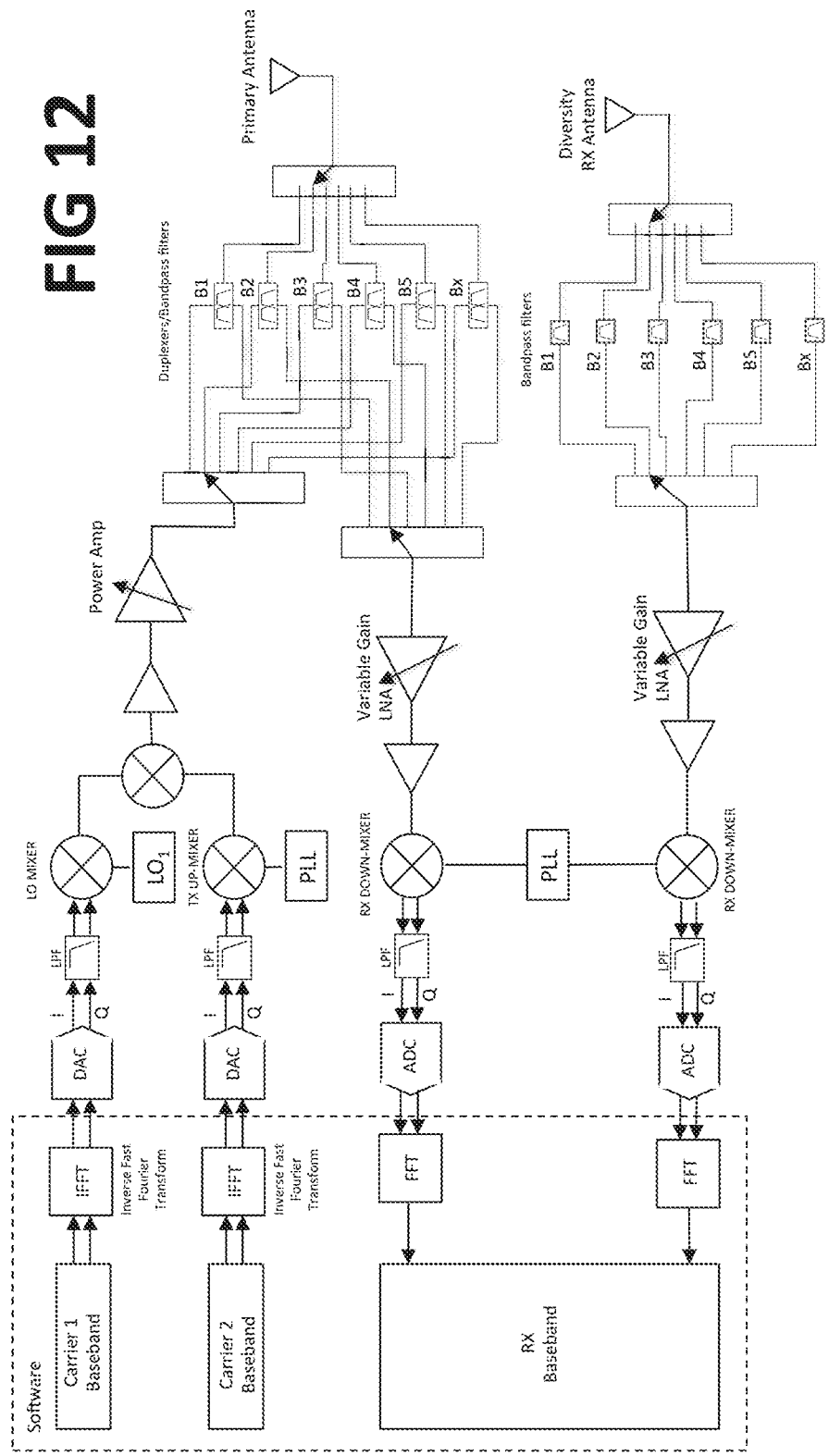
FIG. 12 illustrates a block diagram of typical circuitry of a UE having a single radio circuit for each uplink and downlink directions used for carrier aggregation.

Although FIG. 7a shows the connection management in the RRC-C "connected" state as previously discussed, FIG. 7a (as well as FIGS. 7b-7g) illustrate two cell phone devices with active sessions. Icons of two cell phones are shown for purposes of illustration, but the cell phone icons are meant to represent two active profiles, with each profile having an active session, in a single UE that has only a single set of radio frequency circuitry, as shown in FIG. 14 and described below in reference thereto. In the FIG. 7 figures, the cell phone device is shown as a small cell phone in front of a larger cell phone. This represents a single physical communications device, perhaps an IoT or telematics device containing a single physical radio, but supporting two active identity profiles. The modem in the radio of FIG. 7 contains the typical modem to support LTE with Carrier Aggregation ("CA") as shown in the high level functional diagrams of FIGS. 12 and 14. A UE having the devices depicted in FIG. 7 is differentiated from other devices that support CA, and that is that it contains two, either physical or logical, SIM cards.

Figure 10:
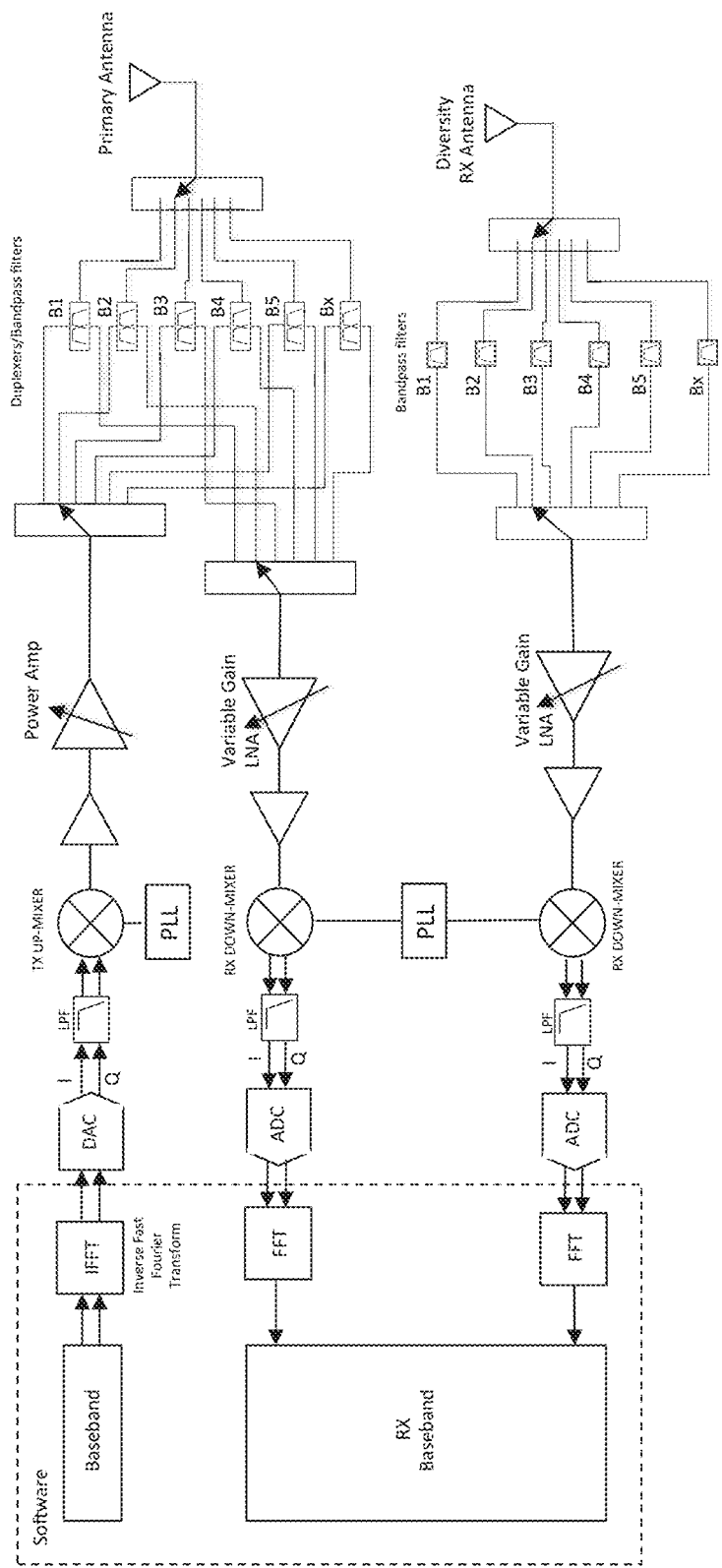
FIG. 10 illustrates a block diagram of typical circuitry of a UE having a single transmit radio and a single receive radio circuit.
Figure 11:
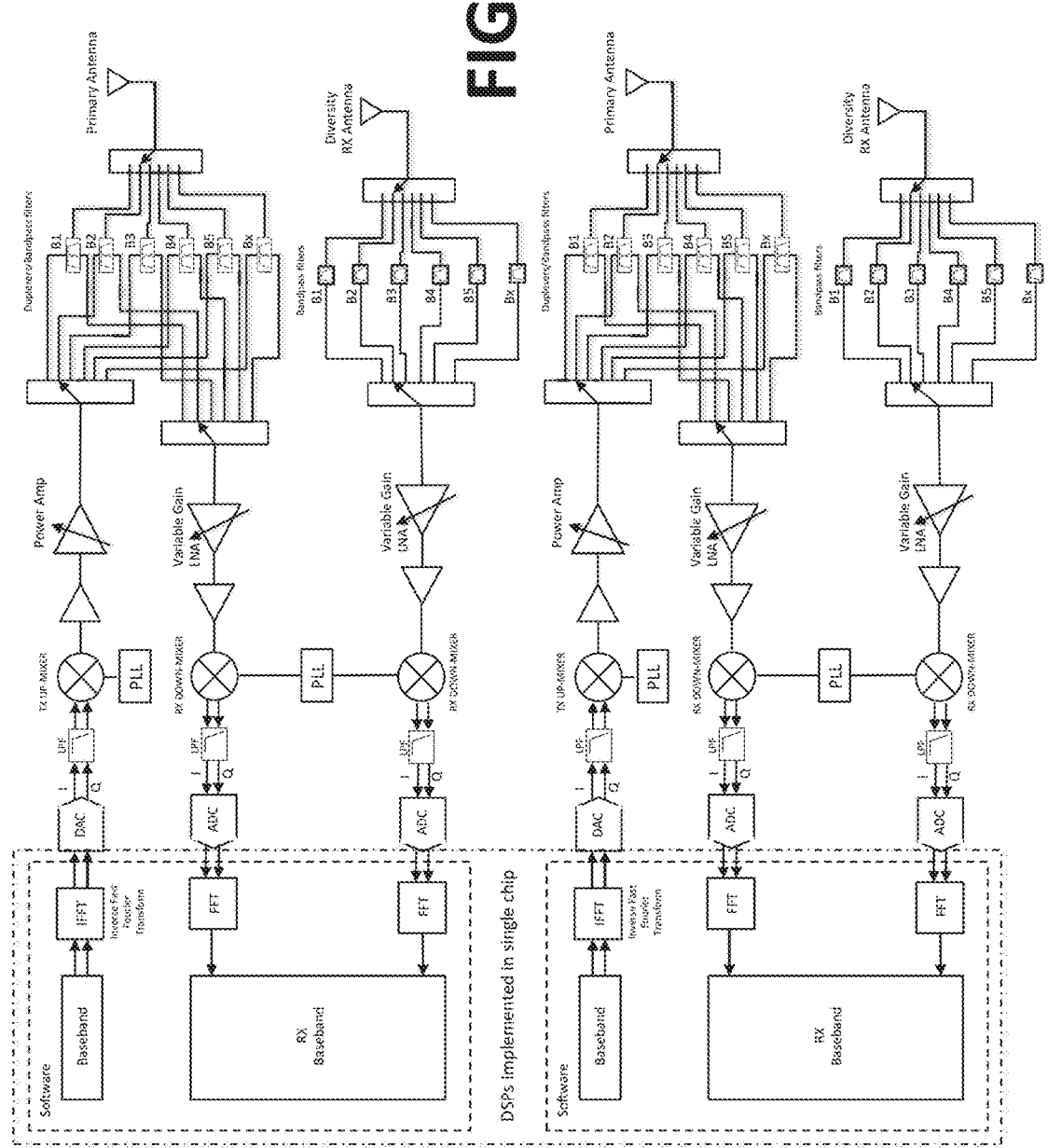
FIG. 11 illustrates a block diagram of typical circuitry of a UE having two different radio circuits for each uplink and downlink directions to support dual SIM identities.

The traditional Dual SIM, Dual Active device currently offered by many manufacturers is a phone/UE device that contains two complete modems, each similar to the single radio implementation of FIG. 10. The traditional Dual SIM, Dual Active device radio implementation shown in FIG. 11 is a very expensive offering because it contains two completely separate radios (i.e., radio frequency transceiver circuitry). As shown in FIG. 11, two complete sets of DACs, ADCs, mixers, amplifiers, switches, duplexers, filters and antennas are required to offer complete operational agility. Each radio has the ability to tune any band among the available bands of the radio design. As shown in FIG. 11, each discrete band, whether the band is 1.4 MHz, 3 MHz, 5 MHz, 10 MHz or 20 MHz requires its own duplexer and band pass filter. The diversity receiver as shown is used to enhance data reception and cannot be tuned to a separate band as the out-of-phase signal is combined in the DSP of the baseband of the receiver.

Disadvantages of the two completely separate sets of transceivers include cost, size, weight, antenna arrangement, receiver desensitization, and battery life. For an in-vehicle telematics device the other factors matter less than cost and antenna arrangement.

Figure 8:
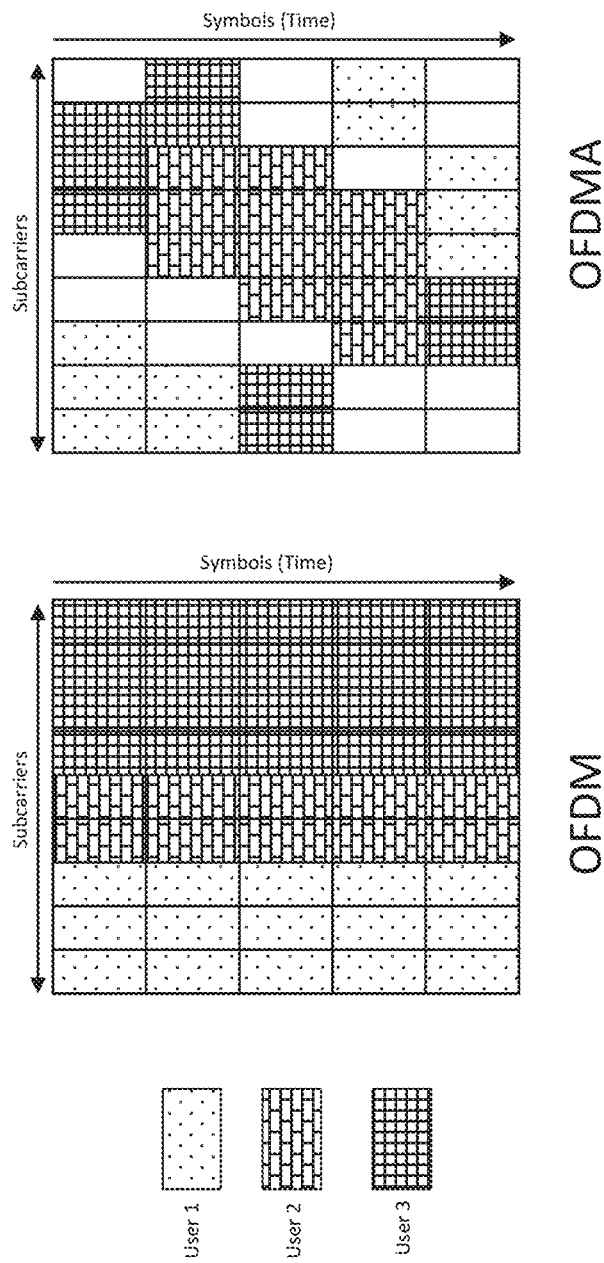
FIG. 8 illustrates a chart showing distribution of wireless spectrum subcarrier assignments made by a RAN to a UE for use in transmitting data flows.

The arrangement shown in FIG. 14, which facilitates a novel aspect disclosed herein, reduces, or eliminates the cost penalty and the antenna arrangement penalty by eliminating the complete extra radio while still supporting dual SIM profiles, or other similar identity profiles. With judicious management of the wireless connection, a cellular device built for Carrier Aggregation can be configured, in an aspect disclosed herein, by software running on the processor of a single-transceiver UE, thus solving the challenges previously mentioned, including the objections for a cell phone. Since an LTE receiver can easily receive every bit transmitted in the pass band of the band pass filters, the receiver portion is easily adapted. The baseband software is adapted to support two complete profiles and communications contexts. The LTE downlink (data from the network to the mobile device) uses Orthogonal Frequency Division Multiple Access (OFDMA). OFDMA enables the transmission of high-quality signals in multipath mobile communication environments. By modifying the number of subcarriers that make up the OFDM signal, it is also possible to adapt to a wide variety of different channel bandwidths and to operate flexibly in accordance with the spectrum assigned to the operator. As shown in FIG. 8, OFDMA is a radio access scheme that uses multiple low data rate carrier "signals" for parallel transmission of wideband data, delivering data at a high data rate that is highly resistant to multipath interference. OFDMA used by LTE differs from OFDM in that OFDMA incorporates elements of TDMA so that the subcarriers can be allocated dynamically among different users of the channel for each time block. The result is a more robust system with increased capacity. The capacity comes from the trunking efficiency gained by multiplexing low rate users onto a wider channel to provide dynamic capacity when needed and the robustness comes from the ability to schedule users by frequency to avoid narrowband interference and multipath fading. FIG. 8 depicts a standard OFDM signal where a user is assigned a certain number of resources (or carriers) and those resources remain constant. The depiction of an OFDMA signal shows the dynamic nature of the resource assignment—in some time blocks, a device may have no resources assigned and in another, potentially all time blocks could be assigned to a specific user, based on traffic demands.

Figure 9:
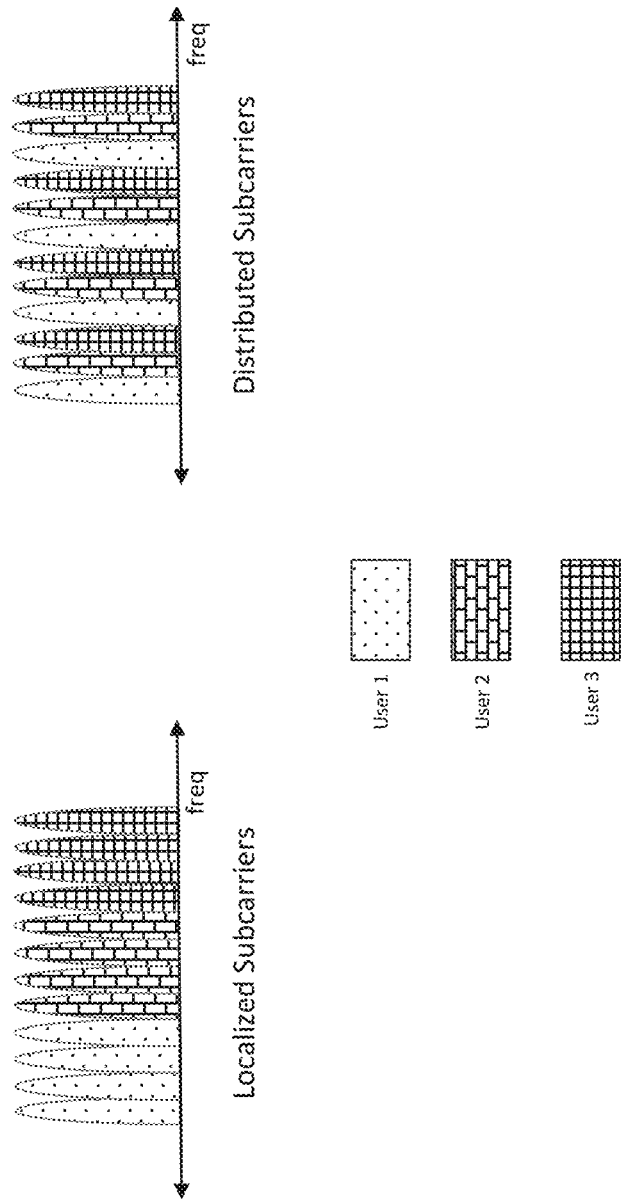
FIG. 9 illustrates a chart showing subcarrier assignments made by a RAN to a given UE that are not spectrally adjacent to other assignments to the same UE.

For uplink transmission (data from the mobile device to the network), LTE uses Single-Carrier Frequency Division Multiple Access. SC-FDMA is a radio access method that implements multiple-access by allocating the signals for different users to different frequencies while transmitting the signals for an individual user at a single frequency. FIG. 9 shows a single time block for three different LTE users.

Multiple subcarriers may be assigned to a given UE. It is possible to support either localized subcarriers as shown in FIG. 9 on the left, or distributed subcarriers as shown on the right. LTE generally uses localized subcarriers, but the generation techniques allow localized subcarriers, distributed subcarriers, or a combination of both. Currently, LTE actually allocates 12 adjacent subcarriers, known as Resource Blocks ("RB") occupying 15 kHz each for a total of 180 kHz of bandwidth.

Figure 13:
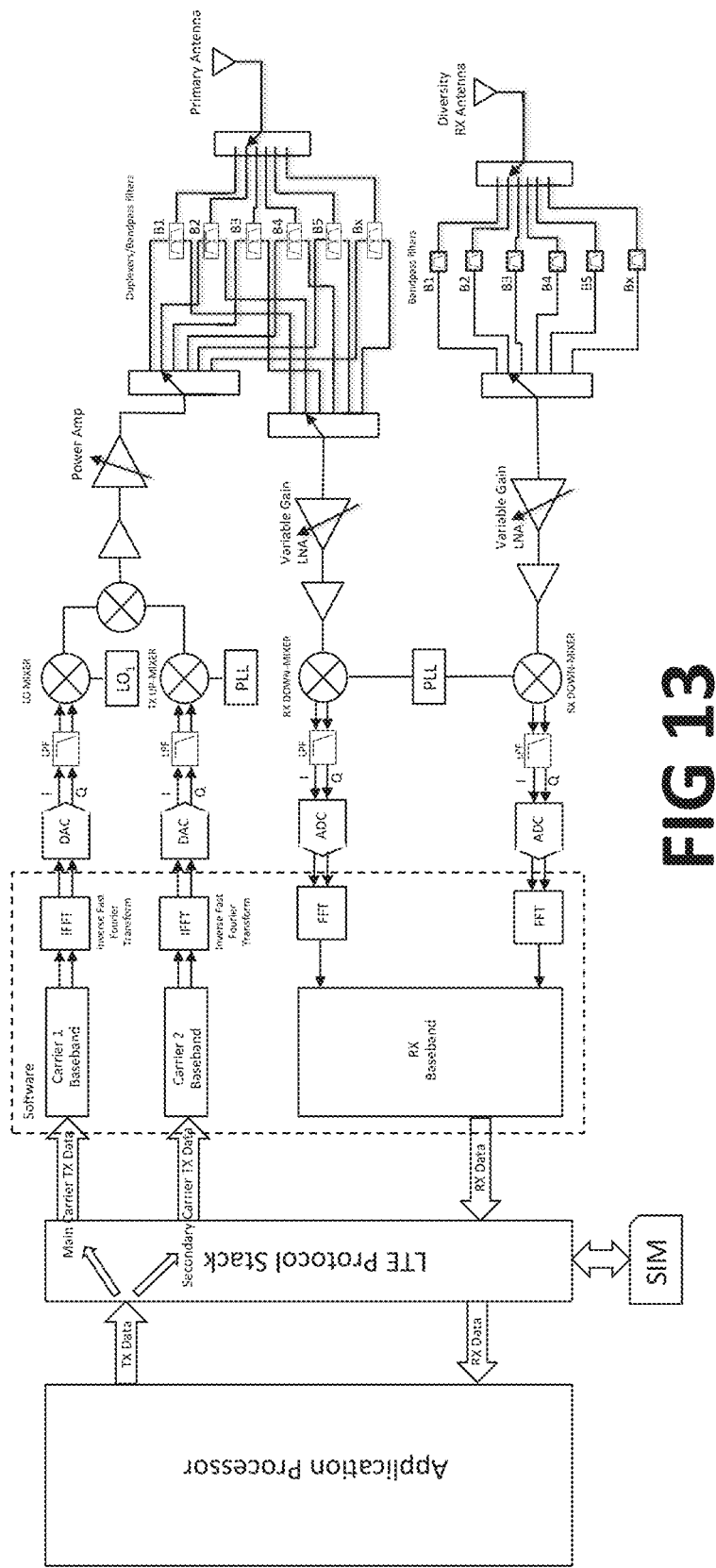
FIG. 13 illustrates a block diagram of a UE with single circuitry for using carrier aggregation to facilitate using carrier aggregation for transmitting an applications data flow in the uplink direction.

An LTE 'stack' and associated 'processor' (may be multiple processors, components, software, etc.) typically facilitate transmitting and receiving signals in the UE using software-based techniques to generate the SC-FDMA signals and receive the OFDMA signals. From a transmission perspective, typically the software is managed by the LTE stack and implemented on one or more Digital Signal Processors ("DSP") generating low frequency composite or baseband transmit signals that are up converted by mixers to the UE operational frequency. The DSP can generate many waveforms, but most DSPs lack the power to support distributed subcarriers as shown on the right in FIG. 9. In order to support CA, which may either be Contiguous ("CC") [Localized] or Non-Contiguous [Distributed], the low current generation DSPs in LTE devices utilize a second transmitter chain, typically mixed at a low level and amplified by a single power amplifier as shown in upper half of FIG. 13. Of course, the solution shown in FIG. 13 has the limitation that it does not support Inter-Band CA, but it offers an acceptable implementation for LTE handset manufacturers. For CA solutions, as shown in FIG. 13, the LTE protocol stack generates two complete IP streams that are combined at the network level for increasing network communications data bandwidth. From a receive perspective, no new hardware is required to support CA since the existing modem can demodulate the entire downlink bandwidth/spectrum from a given eNodeB and the baseband receive module can, thru software, selectively separate the two streams into two discrete IP streams to be delivered to the LTE Protocol stack.

FIG. 14 shows the internal details of the dual profile LTE communications device. Except for the dual SIMs, the hardware implementation may be identical to the hardware implementation of a LTE communications device that supports CA. The dual SIMs, or a single SIM with two different logical channels, is a hardware difference that may facilitate the aspect of a single-transceiver-dual-profile LTE communications device disclosed herein. SIM cards operate with a single logical channel assigned for the primary wireless connection authentication and security. SIM cards usually support multiple logical channels to facilitate a second VoLTE or WiFi authentication and security. That functionality can be repurposed to support the dual profile LTE device if a second profile USIM profile is installed in the SIM card.

FIG. 14 shows a LTE protocol stack 74 with differing data direction lines to support different applications. It is necessary to separate the receive data in the processor 64 managing the baseband and the LTE protocol. The receive data must be managed via two or more context management chains that can perform the entire LTE data (or call) management simultaneously as if they were separate radios. Many of the new CA devices include multiple DSPs that can be logically separated, but this can also be managed on a multi-threaded single DSP. The transmit path can also be managed similarly with two DSPs or a single powerful multi-threaded DSP.

An advantage of the solution shown in FIG. 14 is that the solution can adapt itself to support two discrete communication contexts, or it can adapt itself to using the CA function to add upload and download performance to a high volume, high bandwidth application. Since many telematics applications use one very low volume, almost underused communication context, this solution lends itself well to automotive telematics and customer facing applications combined into a single radio device.

In order to facilitate the described hardware implementation, the network must be manipulated. Ideally, the LTE network will remain unaware that two different "data calls" are carried by the same radio transceiver. This results in a limitation that both profiles must be carried on the same operator using the same frequency band and eNodeB site. FIG. 7a shows the device of FIG. 14 as two cell phones. The large cell phone icon is considered to represent the dominant profile and the second, smaller cell phone icon is considered to represent the recessive profile. The dominant profile is the profile that drives the network operator selection. In our telematics example, it is the profile assigned to the customer by the retail customer/vehicle driver's choice MNO. Since nearly every automotive telematics solutions include an automotive OEM subscription and corresponding identity profile, and this subscription identity profile is the first profile installed in the vehicle, the automotive OEM profile is considered first profile, or Profile 1, in the present discussion. Usually Profile 1 is installed in the vehicle factory. Once a vehicle is sold to a retail customer, and that customer adds a retail data plan, that retail subscription is the second Profile in the vehicle and it becomes Profile 2 as referred to herein. Profile 2 is also the dominant profile since the MNO selected by the retail customer is the operator for all services, because all services are delivered on the same operator using the same frequency band at a given time.

FIG. 7a shows the device operating normally. The eNodeB 48A has requested the UE Profile 1 and Profile 2 to provide measurement reports based on signal strength measurements obtained by the UE reaching, or falling below, certain low-signal-strength thresholds. The single UE mobile device containing two profiles manages the reporting mechanism so that the UE device only transmits Profile 2 (dominant profile) reports. As shown in FIG. 7b, eNodeB 48A initiates a Handoff Request to the network-selected eNodeB, in this case, eNodeB 48B. Once eNodeB 48B responds with a Handoff Acknowledge, eNodeB 48A initiates a Profile 2 Handoff Command, as shown in FIG. 7c. When the UE receives the Handoff Command, the UE initiates a Measurement Report that lists the target eNodeB 48B as the only site available in the list of "possible handoff candidates." Meanwhile the UE begins the transition of the dominant profile 2 context to eNodeB 48B. The transition of Profile 2 to eNodeB 48B is shown in FIG. 7d. The UE device continues to monitor messaging from eNodeB 48A while initiating a Handoff Confirmation to eNodeB 48B. eNodeB 48A meanwhile has sent a Handoff Request and received a Handoff Acknowledge to move Profile 1 over to eNodeB 48B because the UE provided information to eNodeB 48A that only eNodeB 48B meets handoff criteria. FIG. 7e shows eNodeB 48A issuing a Handoff command to Profile 1 all the while things are cleaned up in the network for the data flow from the EPC to the UE on Profile 2. (It will be appreciated that an MME serving eNB 48A or eNB 48B may get involved in a handoff via an S1 interface procedure if an X2 interface connection between the eNBs is not available.)

In FIG. 7f, Profile 1 confirms the handoff to eNodeB 48B, while Profile 2 receives data normally from eNodeB 48B. In the final step, shown at FIG. 7g, eNodeB 48B requests the EPC reroute data directly to eNodeB 48B to complete the handoff for Profile 1.

The handoff process highlighted here shows an active data session for two simultaneously RRC-C data sessions. The process is much simpler for a single RRC-C data session and simpler still for a UE with both profiles in the RRC-I state. Some of the advantages of the solution described in reference to FIGS. 7a-7g include a much lower implementation cost with minimal compromises as compared to using two separate transceivers as shown in FIG. 11. Adapting to differing data requirements is another advantage. Since most wireless communications devices already support CA, it does not require the creation of a higher cost dual radio solution. If the solution is deployed with two active profiles in a single SIM device, using GSMA eSIM/eUICC technology, this solution easily meets the flexibility requirements envisioned by carmakers who have installed two SIM slots in automobiles, but without the heavy burden of four antennas and two complete radio sets.

As discussed above, a UE device that provides simultaneous services for both low bandwidth and high bandwidth services may do so using corresponding first and second identity profiles even if the UE only has a single radio transceiver for transmitting the context data flows over an uplink to a wireless radio access network. As show in FIG. 14, UE device 14 (as described previously in reference to FIG. 1), includes a memory portion 62, a processor 64, first transmit circuitry 66, and second transmit circuitry 68. It will be appreciated that the arrangement, inclusion, or exclusion elements and components of UE 14 are shown, or not shown, for purposes of example, and may vary without departing from the functionality and aspects described herein. The radio transceiver portion 17 of device 14 includes only a single set of radio frequency circuitry for the transmit/uplink direction (i.e., one set of duplexer/bandpass filters, one antenna, one power amplifier) that may receives two signal feeds, from first transmit circuitry 66 and second transmit circuitry 68 as shown in the figure, which transmit circuitry 66 and 68 may partially be part of processor 64 and the functions of which transmit circuitry may be implemented by software running on processor 64, which receive information signals to process from stack 74, and which typically operate at baseband frequency.

As shown in FIG. 14, memory portion 62 may include two SIM profiles. SIM profile 70 may be a first profile for use in setting up and operating a low bandwidth context and SIM profile 72 may be a second profile for use in setting up and operating a high bandwidth, consumer-oriented context. Wireless networking stack 74, which may be an LTE stack, may use second profile 72 to distribute a first portion 76 and a second portion 78 of high bandwidth data flow 34 (described in reference to FIG. 1) to first transmit circuitry 66 and second transmit circuitry 68, respectively. First circuitry 66 and second circuitry 68 may have been instructed by the network to which the UE is connected with to use carriers (which may be referred to herein as subcarriers of the uplink bandwidth that the UE is using for a given network) that are not adjacent to one another spectrally, as shown in the right sides of FIGS. 8 and 9 which illustrate that a RAN does not always assign multiple subcarriers (multiple subcarriers may be assigned to a given UE for purposes of carrier aggregation) that are spectrally adjacent to one another for transmission operation by the given UE.

To facilitate simultaneous transmission of high bandwidth context data according to second profile 72 and low bandwidth context data according to first profile 70, processor 64 may instruct stack 74 to direct all portions of the high bandwidth context according to the second profile to second transmit circuit 68 so that first transmit circuit 66 may be used to transmit the low bandwidth context traffic flow 36 (described in reference to FIG. 1) according to the first profile. First portion 76 is shown as a broken line to represent that it may be moved from first transmit circuit 66 and combined with second portion 78 for combined transmission by second transmit circuit 78 while first transmit circuit transmits the first context flow 36.

If UE 14 moves to a location where the wireless signal is weak, its second context profile (i.e., the second profile that is used for the high bandwidth context) may negotiate a handoff to another cell (typically an eNodeB) that provide a stronger signal and that has a closer, or more direct, path for a wireless link between the UE and cell antenna. For example, in reference to FIG. 2, if device 14 is currently connected to local network 8 via link 20, and is linked to eNodeB 48B, but is moving away from eNodeB 48B and closer to eNodeB 48A, MME 50 may note that the UE has been handed off to eNodeB 48 A. When the low bandwidth first context that may still be established with eNodeB 48 B according to first profile 70 determines that its wireless signal link is weak, it may negotiate a handoff to a stronger cell, in which case it will follow the high bandwidth context and MME 50 will note that the first profile data context has been handed off to eNodeB 48A and will be using whatever spectrum and transmit subcarriers eNodeB 48A has instructed UE 14 to use in connection with the second context which has already been handed over.

As part of the negotiation process between the low bandwidth first context and the RAN (the negotiation typically occurs with the eNodeBs, but the MME associated with the current eNodeB could manage the negotiation), in an aspect disclosed herein, the UE's first context informs the eNodeB to which it is currently connected (i.e., eNodeB 48B in the example discussed above) that the only other RAN it can obtain adequate signal strength measurements from is eNodeB 48A, to which the second high bandwidth context has already been handed off. Even if the first context obtains measurement information from other eNodeBs, such as an eNodeB 48C, that would indicate other eNodeBs to which the first context could be handed off to and operate acceptably, the processor of the UE is configured, typically via software running thereon, to suppress the sending of such information to current eNodeB 48B. Thus, since eNodeB 48B has received information that eNodeB 48A is the only other eNodeB that UE 14 can operate on, eNodeB 48B manages a hand off of the UE to eNodeB 48A, even if an eNodeB 48C would provide better signal strength and may be currently serving fewer other subscribers or has a lower resource utilization than eNodeB 48A. Processor 64, and code running thereon, manages this 'recessive-context-follows-the-dominant-context' feature ("RCFD"), which in essence 'deceives' the RAN such that the recessive first context follows the dominant second context by being handed off to the same eNodeB as the dominant context, even if handing off the recessive first context to a different eNodeB would be a benefit to the network by, for example, resulting in a better RAN load balancing, or would result in a performance benefit for the first context data flow. This RCFD feature ensures that the recessive context necessarily follows the dominant context in handoffs from one cell to another so that the UE can continue to transmit the first and second contexts using a single transmit radio spectrum.

Aspects disclosed herein necessarily address problems rooted in mobile wireless networking technology and are wireless-mobile-network-centric because they are only of use when managing wireless network data bearer traffic between a user equipment device and a wireless mobile network.

What is claimed is:

1. A user equipment device, comprising:
a memory portion that contains:
a first identity profile for use in accessing a first class of service; and
a second identity profile for use in accessing a second class of service; and
a processor to:
manage a first context traffic flow having the first class of service over a single radio access technology of a mobile network according to the first identity profile;
manage a second context traffic flow having the second class of service over the single radio access technology of the mobile network, simultaneously with the first context traffic flow, according to the second identity profile;
wherein data traffic associated with the first and second context traffic flows is processed by a single wireless transceiver simultaneously; and
data traffic associated with both of the first and second traffic flows is routed to a single mobility anchor of the mobile network with which the single wireless transceiver is in communication with.

2. The user equipment device of claim 1 wherein the mobility anchor is a serving gateway of the mobile network.

3. The user equipment device of claim 1, wherein the processor is further to: distribute portions of the second context traffic flow by directing a first portion of the second context traffic flow to a first subcarrier transmit circuit of the device and by directing at least a second portion of the second context traffic flow to a second subcarrier transmit circuit.

4. The user equipment device of claim 3 wherein the processor only distributes to the first subcarrier transmit circuit and to the second subcarrier transmit circuit the first and second portions of the second context traffic flow for transmission when no portion of the first context traffic flow is being transmitted.

5. The user equipment device of claim 3 wherein the processor is further to: cause the first transmit circuit and the second transmit circuit to transmit the first portion and second portion of the second data session traffic flow, respectively, on sub carriers that are not spectrally adjacent to each other.

6. The user equipment device of claim 3 wherein the first and second transmit circuits are virtual transmit circuits that use a single hardware circuit, wherein the single hardware circuit uses a single digital to analog conversion module for transmission of the first and second portions of the second context traffic flow.

7. The user equipment device of claim 1 wherein the first and second context traffic flows are both transmitted in the same band of wireless spectrum.

8. The user equipment device of claim 1 wherein each of the first identity profile and the second identity profile is associated with a different long-range wireless network than the other.

9. The user equipment device of claim 1 wherein the processor is further to: necessarily cause the first context traffic flow to follow a handoff from a first wireless cell to a second wireless cell to follow a handoff already completed of the second context traffic flow from the first wireless cell to the second wireless cell according to the second identity profile.

10. The user equipment device of claim 9 wherein the user equipment device reports that the second wireless cell is the only cell that can support an acceptable data communication session for the first context data flow, even if a cell other than the first cell or the second cell could support an acceptable data communication session for the first context data flow.

11. The user equipment device of claim 10 wherein the first and second context data flows are EPS bearers.

12. The user equipment device of claim 1 wherein the memory portion is a SIM and wherein the SIM stores both the first and second identity profiles.

13. A user equipment device, comprising:
a memory portion that contains:
a first identity profile for use in accessing a first class of service; and
a second identity profile for use in accessing a second class of service; and
a processor to:
manage a first context traffic flow having the first class of service over a single radio access technology of a mobile network according to the first identity profile;
manage a second context traffic flow having the second class of service over the single radio access technology of the mobile network, simultaneously with the first context traffic flow, according to the second identity profile; and
wherein the processor is further to: necessarily cause the first context traffic flow to follow a handoff from a first wireless cell to a second wireless cell to follow a handoff already completed of the second context traffic flow from the first wireless cell to the second wireless cell according to the second identity profile.

14. The user equipment device of claim 13 wherein the user equipment device reports that the second wireless cell is the only cell that can support an acceptable data communication session for the first context data flow, even if a cell other than the first cell or the second cell could support an acceptable data communication session for the first context data flow.

15. The user equipment device of claim 14 wherein the first and second context data flows are EPS bearers.

16. A user equipment device, comprising:
a memory portion that contains:
a first identity profile for use in accessing a first class of service; and
a second identity profile for use in accessing a second class of service; and
a processor to:
manage a first context traffic flow having the first class of service over a single radio access technology of a mobile network according to the first identity profile;
manage a second context traffic flow having the second class of service over the single radio access technology of the mobile network, simultaneously with the first context traffic flow, according to the second identity profile;
wherein the processor is further to: distribute portions of the second context traffic flow by directing a first portion of the second context traffic flow to a first subcarrier transmit circuit of the device and by directing at least a second portion of the second context traffic flow to a second subcarrier transmit circuit; and
wherein the first and second transmit circuits are virtual transmit circuits that use a single hardware circuit, wherein the single hardware circuit uses a single digital to analog conversion module for transmission of the first and second portions of the second context traffic flow.

\* \* \* \* \*